(12) United States Patent
Matsuno et al.

(10) Patent No.: US 6,361,125 B1
(45) Date of Patent: Mar. 26, 2002

(54) HYDRAULIC BRAKE BOOSTER

(75) Inventors: Isao Matsuno; Joichi Nakano, both of Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 09/466,882

(22) Filed: Dec. 20, 1999

(30) Foreign Application Priority Data

Dec. 21, 1998 (JP) .......................... 10-363391
Apr. 28, 1999 (JP) .......................... 11-122932

(51) Int. Cl.[7] ............................ B60T 8/44
(52) U.S. Cl. ........................ 303/114.1; 188/359
(58) Field of Search .................. 303/113.3, 114.1, 303/114.2, 9.75, 116.1, 115.4; 188/355, 358, 359, 360

(56) References Cited

U.S. PATENT DOCUMENTS

| | | | |
|---|---|---|---|
| 4,578,951 A | 4/1986 | Belart et al. | 303/115.4 |
| 4,602,824 A * | 7/1986 | Nishimura et al. | 303/116.1 |
| 4,715,664 A * | 12/1987 | Nakanishi et al. | 303/115.4 |
| 4,730,879 A | 3/1988 | Adachi et al. | 303/116.4 |
| 4,800,289 A * | 1/1989 | Adachi et al. | 303/116.1 |
| 4,838,621 A | 6/1989 | Furuta et al. | 303/115.4 |
| 4,869,560 A * | 9/1989 | Nishii | 303/114.1 |
| 5,013,094 A | 5/1991 | Nishii et al. | 303/113.2 |
| 6,053,583 A * | 4/2000 | Gansel | 303/113.3 |

FOREIGN PATENT DOCUMENTS

JP  4-864  1/1992

\* cited by examiner

Primary Examiner—Douglas C. Butler
Assistant Examiner—Thomas J. Williams
(74) Attorney, Agent, or Firm—McGuireWoods LLP

(57) ABSTRACT

A hydraulic brake booster includes a primary master cylinder $M_1$, a hydraulic power source 5, a fluid tank 11 and proportional booster valves Vf, Vr for boosting an output hydraulic pressure from the primary master cylinder $M_1$ proportionally so as to supply the hydraulic pressure so boosted to wheel brakes Bfa, Bfb, Bra, Brb, the proportional booster valves being constructed as a spool type proportional booster valve.

18 Claims, 15 Drawing Sheets

HYDRAULIC BRAKE BOOSTER

BACKGROUND OF THE INVENTION

1. Field of the Invention

The present invention relates to a hydraulic brake booster for boosting a hydraulic pressure so as to actuate brakes of a vehicle such as an automobile or a motorcycle.

2. Description of the Related Art

Such a hydraulic brake booster is already known and is disclosed, for instance, in Japanese Examined Patent Publication No. HEI 4-864.

In a conventional hydraulic brake booster, a hydraulic booster adapted to be actuated by a valve piston connected to a brake pedal and a master cylinder adapted to be actuated by a piston of the hydraulic booster are connected to each other in series, and therefore the overall length of the booster so constructed tends to be extremely large, and therefore it is sometimes found difficult to install such a booster in a limited space of a vehicle.

SUMMARY OF THE INVENTION

The present invention was made in view of these circumstances, and an object thereof is to provide a hydraulic brake booster that allows constituent elements to be disposed freely, which can easily be installed even in a limited space and which is simple in construction.

To attain the above object, according to a first aspect of the invention, there is provided a hydraulic brake booster comprising:

- a primary master cylinder which generates an output hydraulic pressure in response to a brake operation input;
- a hydraulic power source;
- a fluid tank which stores fluid for the hydraulic power source; and
- a proportional booster valve which proportionally boosts an output hydraulic pressure from the primary master cylinder and supplies the output hydraulic pressure so boosted to wheel brakes, the proportional booster valve including:
  - a casing having a cylinder bore;
  - a control piston unit defining in conjunction with the cylinder bore, a controlling hydraulic pressure chamber introducing an output hydraulic pressure from the primary master cylinder and a boosting hydraulic pressure chamber generating a boosting hydraulic pressure for actuating wheel brakes, the control piston fitted in said cylinder bore so as to reciprocate between a first position and a second position in response to hydraulic pressures of the controlling hydraulic pressure chamber and the boosting hydraulic pressure chamber, the first position defining the maximum controlling hydraulic pressure chamber, the second position defining the minimum controlling hydraulic pressure chamber;
  - an inlet valve communicating between the hydraulic power source and the boosting hydraulic pressure chamber in response to the movement of the control piston unit; and
  - an outlet valve communicating between the boosting hydraulic pressure chamber and the fluid tank in response to the movement of the control piston unit, wherein the inlet valve is opened and the outlet valve is closed when the control piston unit is located at the first position, and the inlet valve is closed and the outlet valve is opened when the control piston unit is located at the second position, whereby a hydraulic pressure boosted in proportion to the hydraulic pressure of the controlling hydraulic pressure chamber is generated in the boosting hydraulic pressure chamber.

Further, according to a second aspect, there is provided a hydraulic brake booster comprising:

- a primary master cylinder which generates an output hydraulic pressure in response to a brake operation input;
- a hydraulic power source;
- a fluid tank which stores fluid for the hydraulic power source; and
- a proportional booster valve which proportionally boosts an output hydraulic pressure from the primary master cylinder and supplies the output hydraulic pressure so boosted to wheel brakes, the proportional booster valve including:
  - a valve housing having a cylinder bore, a valve bore communicating with one end of the cylinder bore, a hydraulic power source port communicating with said hydraulic power source and opened to an inner circumferential surface of the valve bore, a return port communicating with the fluid tank and opened to the inner circumferential surface of the valve bore and a booster port communicating with the wheel brakes;
  - a control piston slidably fitted in the cylinder bore so as to be reciprocate between a first position and a second position and defining at the other end of the cylinder bore a controlling hydraulic pressure chamber for introducing the output hydraulic pressure from the primary master cylinder; and
  - a spool valve body connected to the control piston and slidably fitted in the valve bore,
    wherein when the control piston is located at the first position through boosting the hydraulic pressure in the controlling hydraulic pressure chamber, the spool valve body establishes a communication between the hydraulic power port and the booster port, and
    when the control piston is located at the second position through reducing the hydraulic pressure in the controlling hydraulic pressure chamber, the spool valve body establishes a communication between the return port and the booster port.

DETAILED DESCRIPTION OF THE PREFERRED EMBODIMENTS

A mode of operation of the present invention will be described below based on embodiments according to the present invention shown in the accompanying drawings.

[First Embodiment]

Figure 1:
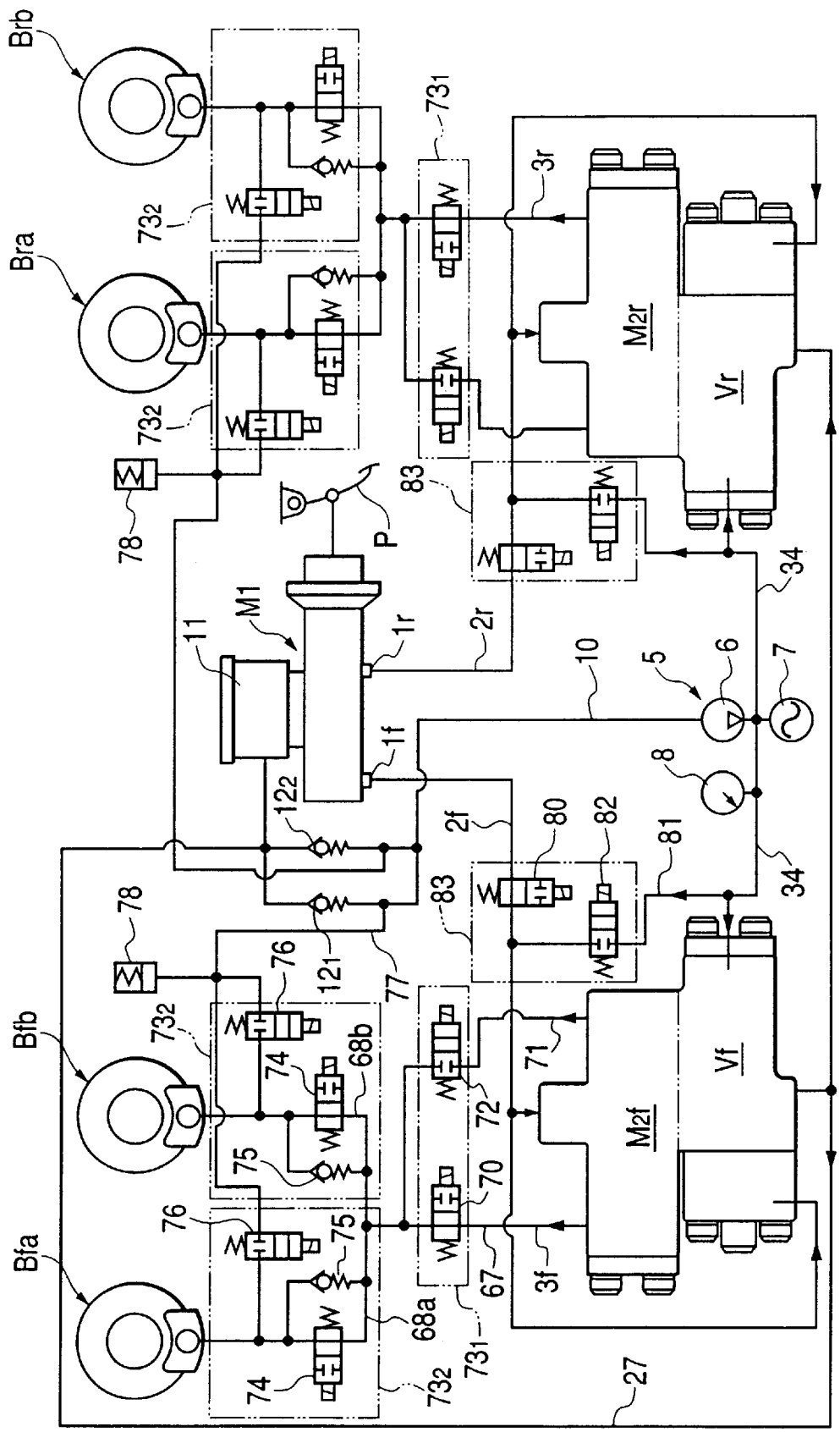
FIG. 1 is a hydraulic pressure circuit diagram of an automobile brake system equipped with hydraulic brake boosters according to a first embodiment of the present invention.

First of all, a first embodiment of the present invention will be described with reference to FIGS. 1 to 3. In FIG. 1, a primary master cylinder $M_1$ is a tandem master cylinder comprising a pair of front and rear output ports $1f$, $1r$ for outputting brake hydraulic pressures in response to an input applied to a piston from a brake pedal P. A front proportional booster valve Vf and a front secondary master cylinder $M_2f$ are connected to a front input fluid passage $2f$ extending from the front output port $1f$, and a rear proportional booster valve Vr and a rear secondary master cylinder $M_2r$ are connected to a rear input fluid passage $2r$ extending from the rear output port $1r$. In addition, a pair of front wheel brakes Bfa, Bfb for braking front left and right wheels are connected to a front main brake fluid passage $3f$ extending from the front secondary master cylinder $M_2f$, and a pair of rear wheel brakes Bra, Brb for braking rear left and right wheels are connected to a rear main brake fluid passage $3r$ extending from the rear secondary master cylinder $M_2r$.

Reference numeral 5 denotes a common hydraulic power source connected to the front and rear proportional booster valves Vf, Vr, and comprises a hydraulic pump 6 driven by an electric motor, not shown, and an accumulator 7 for accumulating discharge hydraulic pressures from the hydraulic pump. The hydraulic pressure of this accumulator 7 is detected by a hydraulic pressure sensor 8, and when a detected hydraulic pressure is equal to or lower than a lower limit value, the hydraulic pump 6 is actuated, while the detected hydraulic pressure is equal to or higher than an upper limit value, the operation of the hydraulic pump 6 is stopped.

An intake side of the hydraulic pump 6 is connected to a fluid tank 11 of the primary master cylinder $M_1$ via an intake fluid passage 10, and first and second one-way valves $12_1$, $12_2$ for preventing back flow are provided in parallel at an intermediate position along the length of the connecting line.

Since the front wheel brakes Bfa, Bfb hydraulic pressure circuit including the front proportional booster valve Vf and the front secondary master cylinder $M_2f$ and the rear wheel brakes Bra, Brb hydraulic pressure circuit including the rear proportional booster valve Vr and the rear secondary master cylinder $M_2r$ have the same construction, referring to FIGS. 1 and 2, the front wheel brakes Bfa, Bfb hydraulic pressure circuit will be described as representing the two hydraulic pressure circuits.

Figure 2:
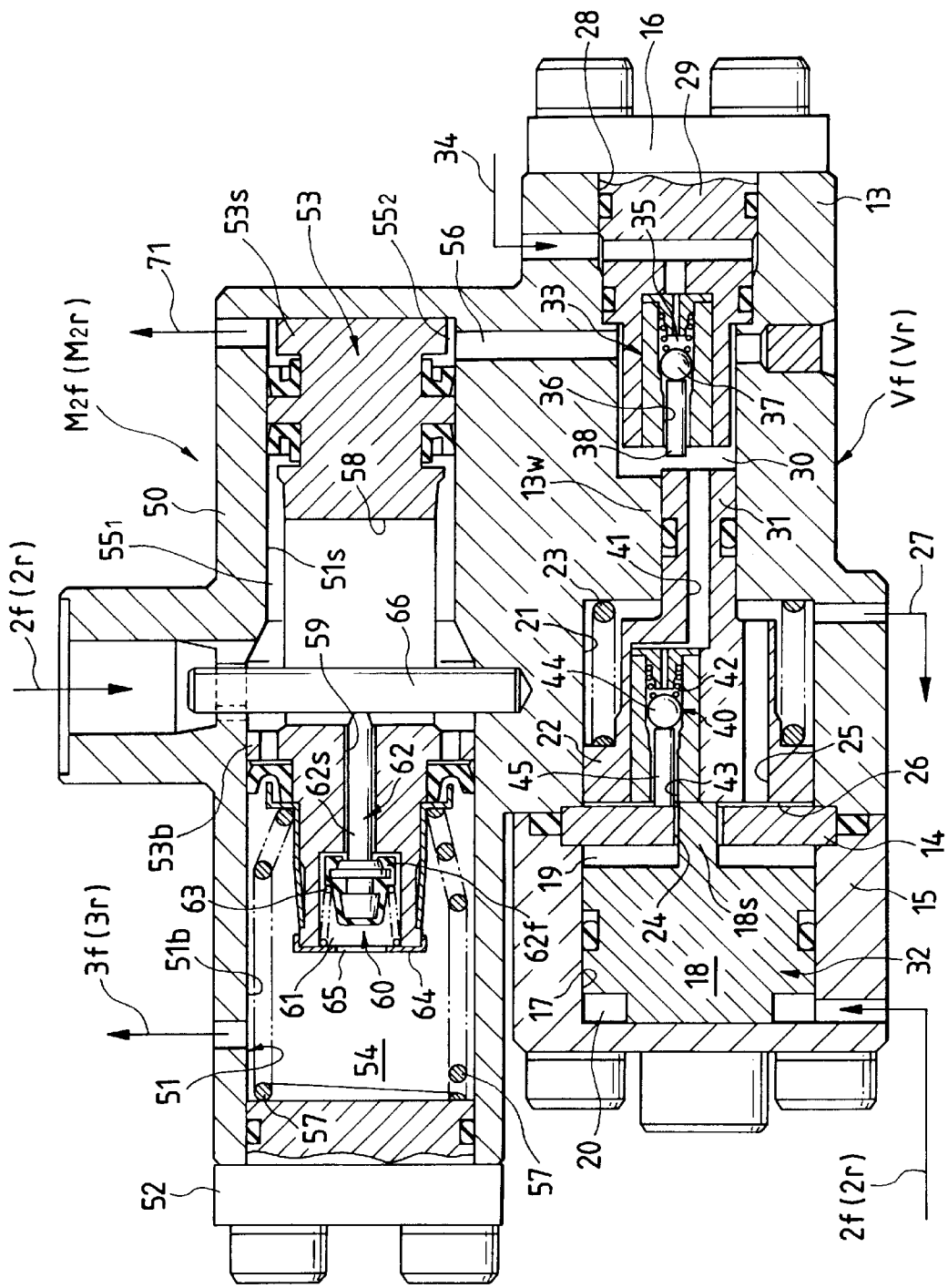
FIG. 2 is an enlarged longitudinal sectional view of a proportional booster valve and a secondary master cylinder shown in FIG. 1.

First of all, in FIG. 2, the front proportional booster valve Vf comprises a valve casing 13, a cap 15 joined to one end of the valve casing 13 with a bulkhead plate 14 being interposed therebetween, a lid plate 16 joined to the other end of the same casing 13. The cap 15 has a bottomed cylinder bore 17 whose opening end surface is closed with the bulkhead plate 14. The interior of the cylinder 17 is partitioned by a control piston 18 fittingly mounted in the cylinder into an atmospheric pressure chamber 19 on the bulkhead plate 14 side and a controlling hydraulic pressure chamber 20 on a side opposite to the bulkhead plate side, and the front input fluid passage $2f$ is connected to this controlling hydraulic pressure chamber 20.

The casing 13 has a bottomed cylinder bore 21 whose opening end surface is closed with the bulkhead plate 14, and a valve piston 22 is slidably fitted in the cylinder bore 21. In addition, a return spring 23 is accommodated in the cylinder bore 21 for biassing the piston 22 toward the bulkhead plate 14. The control piston means 32 comprises the above control piston 18 and the valve piston 22.

A through hole 24 is formed in a central portion of the bulkhead plate 14, and a small shaft $18s$ is provided on the control piston 18 in such a manner as to protrude therefrom so as to penetrate the through hole 24 for abutment with an end face of the valve piston 22, whereby the control piston 18 can push the valve piston 22 via this small shaft $18s$.

Provided in the valve piston 22 are a through hole 25 for establishing a communication between ends of the valve piston 22 and a groove 26 for allowing the through hole 25 to communicate with the through hole 24 at a face thereof corresponding to the bulkhead plate 14, and the respective portions of the cylinder bore 21 of the casing 13 are allowed to communicate with the atmospheric pressure chamber 19 therewith. A return fluid passage 27 is connected to either the cylinder bore 21 or the atmospheric pressure chamber 19, and a downstream end of the return fluid passage 27 is connected to the intake fluid passage 10 between the first and second one-way valves $12_1$, $12_2$ and the fluid tank 11.

In addition, provided in the casing 13 is a bottomed mounting bore 28 with a bulkhead $13w$ integral with the casing being interposed between the cylinder bore 21 and the mounting bore 28 in such a manner as to align axially with the cylinder bore 21, an opening end surface of the bottomed mounting bore 28 being closed with the lid plate 16. A valve housing 29 is fixedly mounted in the bottomed mounting bore 28, and a boosting hydraulic pressure chamber 30 is formed in a bottom portion of the mounting bore 28. Formed integrally with the bulkhead 13w is a reaction force piston 31 which penetrates the bulkhead 13w fluid-tightly and sidably so as to face the boosting hydraulic pressure chamber 30 at a distal end thereof. The diameter of this reaction force piston 31 is made sufficiently smaller than that of the control piston 18.

An inlet valve 33 is provided in the valve housing 29 for opening and/or closing a fluid passage between the accumulator 7 and the boosting hydraulic pressure chamber 30. In other words, the inlet valve 33 comprises a valve chamber 35 to which a high pressure fluid passage 34 extending from the accumulator 7 is connected, a valve hole 36 for allowing this valve chamber 35 to communicate with the boosting hydraulic pressure chamber 30, a check valve 37 accommodated in the valve chamber 35 and biassed with a spring therein so as to close the valve hole 36 and a valve opening rod 38 loosely penetrating the valve hole 36 so as to confront the check valve 37, and when it is pushed by the reaction force piston 31, the valve opening rod 38 is constructed to open the check valve 37.

In addition, an outlet valve 40 is provided in the valve piston 22 for opening and/or closing a fluid passage between the boosting hydraulic pressure chamber 30 and the groove 26 of the valve piston 22. In other words, the outlet valve 40 comprises a valve chamber 42 adapted to communicate with the boosting hydraulic pressure chamber 30 via a through hole 41 in the reaction force piston 31, a valve hole 43 for allowing this valve chamber 42 to communicate with the groove 26 in the valve piston 22, a check valve 44 accommodated in the valve chamber 42 and biassed therein with a spring so as to close the valve hole 43 and a valve opening rod 45 loosely penetrating the valve hole 43 so as to confront the check valve 44, and when it is pushed by the bulkhead plate 14 as the valve piston 22 is withdrawn, the valve opening rod 45 is adapted to then open the check valve 44.

Next, the front secondary master cylinder $M_2f$ comprises a cylinder body 50 formed integrally with the casing 13 of the front proportional booster valve Vf and a lid plate 52 for closing a front open end face of a bottomed cylinder bore 51 in the cylinder body 50. The cylinder bore 51 is formed as a stepped bore having a large-diameter bore portion 51b and a small-diameter bore portion 51s, and an operating piston 53 is slidably fitted in the cylinder bore 51, the operating piston 53 having a large-diameter piston portion 53b and a small-diameter piston portion 53s which correspond to the large-diameter bore portion 51b and the small-diameter bore portion 51s, respectively. The cylinder bore 51 is divided by the working piston 53 into three partitions such as a front output hydraulic pressure chamber 54, the intermediate first input hydraulic pressure chamber $55_1$, and a rear second input hydraulic pressure chamber $55_2$. The first input hydraulic pressure chamber $55_1$ is connected to the front input fluid passage 2f. The output hydraulic pressure chamber 54 is connected to the main brake fluid passage 3f. In addition, the second input hydraulic pressure chamber $55_2$ is connected to the boosting hydraulic pressure chamber 30 via a communicating hole 56 (booster port) provided in the cylinder body 50 and the casing 13. A return spring 57 is accommodated in the output hydraulic pressure chamber 54 for biassing the operating piston 53 in a retracting direction.

Formed in the operating piston 53 are an elongated bore 58 extending longitudinally through an intermediate portion of the piston so as to open to the first input hydraulic pressure chamber 55 and a relief portion 59 penetrating from this elongated bore 58 through a central portion of the large-diameter piston portion 53b, and a relief port valve 60 is provided as a valve means for opening and/or closing the relief port 59. The elongated bore 58 is disposed such that its length which is longer than a sliding stroke of the operating piston 53 is oriented in an axial direction of the same piston 53.

The relief port valve 60 has a bottomed cylindrical valve chamber 61 formed in a front end face of the large-diameter piston portion 53b, and the relief port 59 opens to a bottom surface of the same cylindrical valve chamber 61 at a front end thereof. Accommodated in the valve chamber 61 are an umbrella portion 62f of a poppet valve body 62 whose valve stem 62s is loosely inserted into the relief port 59 and a valve spring 63 for biassing the umbrella portion 62s toward a relief port 59 side with a view to closing the relief port 59. A retainer 64 for supporting a fixed end of the valve spring 63 is securely fitted on a distal end of the large-diameter piston portion 53b. A communicating hole 65 is formed in the retainer 64 for establishing a communication between the valve chamber 61 and the output hydraulic pressure chamber 54.

A valve opening rod 66 extending through the elongated bore 58 of the operating piston 53 is fixed at ends thereof to the cylinder body 50. The valve opening rod 66 is disposed so as to receive a rear end of the poppet valve body 62 when the operating piston 53 occupies a retracted position to thereby open the poppet valve body 62. Therefore, when the operating piston 53 advances, the poppet valve body 62 moves away from the valve opening rod 66 without any delay, and the poppet valve body 62 can be closed by virtue of the biassing force of the valve spring 63.

Returning back to FIG. 1 again, the main brake fluid passage 3f for connecting the output hydraulic pressure chamber 54 of the front master cylinder $M_2f$ to front left wheel brake Bfa and the front right wheel brake Bfb includes an upstream fluid passage 67 communicating with the output hydraulic pressure chamber 54 and an left downstream fluid passage 68a and a right downstream fluid passage 68b which branch from the upstream fluid passage 67 to lead to the front left wheel brake Bfa and the front right wheel brake Bfb, respectively. An anti-locking controlling normally opened shut-off valve 70 is interposed at a position along the length of the upstream fluid passage 67. In addition, an anti-locking brake fluid passage 71 continuous with the second input hydraulic pressure chamber $55_2$ of the front secondary master cylinder $M_2f$ is connected to the upstream fluid passage 67 at a position downstream of the shut-off valve 70. An anti-locking controlling normally closed first inlet valve 72 is interposed at a position along the length of the anti-locking brake fluid passage 71. A first anti-locking control valve means $73_1$ is constituted by those anti-locking controlling shut-off valve 70 and first inlet valve 72.

Anti-locking controlling normally opened second inlet valves 74, 74 and one-way valves 75, 75 are connected in parallel to the left and right downstream fluid passages 68a, 68b, respectively. The one-way valves 75, 75 are constructed so as to allow a hydraulic pressure to return toward the front secondary master cylinder $M_2f$ side from the front wheel brakes Bfa, Bfb when the anti-locking controlling normally closed second inlet valves 74, 74 are closed.

Discharge fluid passages 77, 77 are connected to the downstream fluid passages 68a and 68b, respectively, downstream of the second inlet valves 74, 74 and the one-way valves 75, 75. Anti-locking controlling normally closed outlet valves 76, 76 are interposed at positions along the length of the discharge fluid passages 77, 77, respectively.

The discharge fluid passages 77, 77 are combined into one fluid passage at downstream ends thereof and then connected to the intake fluid passage 10 between the first one-way valve $12_1$ and the hydraulic pump 6. A hydraulic reservoir 78 is connected to the combined discharge fluid passage 77.

A second anti-locking control valve means $73_2$ is constituted by the anti-locking controlling second inlet valves 74 and outlet valves 76.

The discharge fluid passage 77 on the rear wheel brakes Bra, Brb side is connected at a downstream end thereof to the intake fluid passage 10 between the second one-way valve $12_2$ and the hydraulic pump 6.

In addition, a normally opened outlet valve 80 for automatic braking is interposed at a position along the length of the front input fluid passage 2f, and a normally closed inlet valve 82 for automatic braking is interposed at a position along the length of an auxiliary input fluid passage 81 connecting the front input fluid passage 2f and the accumulator 7 downstream of the outlet valve 80. An automatic braking control valve means 83 is constituted by these automatic braking outlet valve 80 and inlet valve 82.

Next, an operation of this embodiment will be explained.

A hydraulic pressure outputted from the front and rear output ports 1f, 1r of the primary master cylinder $M_1$ when the brake pedal P is pressed down is supplied to the first input hydraulic pressure chambers $55_1$ of the front and rear secondary master cylinders $M_2f$, $M_2r$ and the controlling hydraulic pressure chambers 20 of the front and rear proportional booster valves Vf, Vr.

The hydraulic pressure supplied to the first input hydraulic pressure chamber $55_1$ of the front secondary master cylinder $M_2f$ is delivered to the front wheel brakes Bfa, Bfb after passing through the relief port valve 60 in an opened state, the output hydraulic pressure chamber 54 and the front main brake fluid passage 3f in that order and actuates them in a normal way.

On the other hand, when a hydraulic pressure supplied into the controlling hydraulic pressure chamber 20 of the front proportional booster valve Vf becomes equal to or exceeds a predetermined value regulated by the set load of the return spring 23, since the control piston 18 advances together with the valve piston 22 by virtue of the hydraulic pressure as compressing the return spring 23, in the outlet valve 40 the valve opening rod 45 is released from the bulkhead plate 14, and therefore the check valve 44 is closed, following this, since the reaction piston 31 pushes the valve opening rod 38 of the inlet valve 33 as the valve piston 22 advances, whereby the check valve 37 is opened. Then, the hydraulic pressure of the accumulator 7 is delivered to the boosting hydraulic pressure chamber 30 through the inlet valve 33. This hydraulic pressure acts on an end face of the reaction force piston 31 to generate a reaction force, and the reaction force so generated functions to bias the valve piston 22 and the control piston 18 in a withdrawing direction. As a result of this, when the reaction force becomes larger than the pressing force of the control piston 18 resulting from the hydraulic pressure of the controlling hydraulic pressure chamber 20, both of the pistons 18, 22 are withdrawn so as to close the inlet valve 33 and open the outlet valve 40, whereby a supply of hydraulic pressures from the accumulator 7 to the boosting hydraulic pressure chamber 30 is cut off and the hydraulic pressure in the boosting hydraulic pressure chamber 30 is leaked to the atmospheric pressure chamber 19 side. Then, when the pressing force of the control piston 18 resulting from the hydraulic pressure in the controlling hydraulic pressure chamber 20 balances the aforesaid reaction force, both the inlet valve and the outlet valve 40 are closed so as to hold the hydraulic pressure inside the boosting hydraulic pressure chamber 30. In addition, when the pressing force of the control piston 18 resulting from the hydraulic pressure in the controlling hydraulic pressure chamber 20 exceeds the aforesaid reaction force, both of the pistons 18, 22 advance again, and the outlet valve 40 is closed while the inlet valve 33 is opened, and therefore, the supply of hydraulic pressures from the accumulator 7 to the boosting hydraulic pressure chamber 30 is resumed. The hydraulic pressure of the boosting hydraulic pressure chamber 30 is controlled so as to be boosted in proportion to the hydraulic pressure of the controlling hydraulic pressure chamber 20, in other words, the output hydraulic pressure from the primary master cylinder $M_1$ by repeating aforesaid operations.

Since the hydraulic pressure of the boosting hydraulic pressure chamber 30 that is controlled as described above is delivered to the second input hydraulic pressure chamber $55_2$ of the front secondary master cylinder $M_2f$ via a communication hole 56 so as to push the small-diameter piston portion 53s of the operating piston 53, the operating piston 53 is caused to advance. When the operating piston 53 advances, since the relief port valve 60 is closed immediately, a hydraulic pressure is generated as the operating piston 53 advances, and the hydraulic pressure so generated is outputted to the front main brake fluid passage 3f to thereby be delivered to the front wheel brakes Bfa, Bfb for boost actuating them.

While this happens, the hydraulic pressure in the boosting hydraulic pressure chamber 30 continues to impart a reaction force to the reaction force piston, and since the reaction is feedback to the brake pedal P, the operator can detect the magnitude of hydraulic pressure inside the boosting hydraulic pressure chamber 30, i.e., the braking force, whereby he or she can feel the brakes operating properly.

In addition, the operating piston 53 in the front secondary master cylinder $M_2f$ includes a large-diameter piston portion 53b on a front side and a small-diameter piston portion 53s on a rear side, and a hydraulic pressure, i.e., the output hydraulic pressure from the primary master cylinder $M_1$ is received by confronting surfaces of those large-diameter and small-diameter piston portions or the first input hydraulic pressure chamber $55_1$. Thus, in a state in which the relief port valve 60 is closed, a thrust force obtained by multiplying a difference in area between the confronting surfaces of those piston portions by the hydraulic pressure in the first input hydraulic pressure chamber $55_1$ is additionally applied to the operating piston 53, this contributing to boosting a hydraulic pressure generated in the output hydraulic pressure chamber 54.

Figure 3:
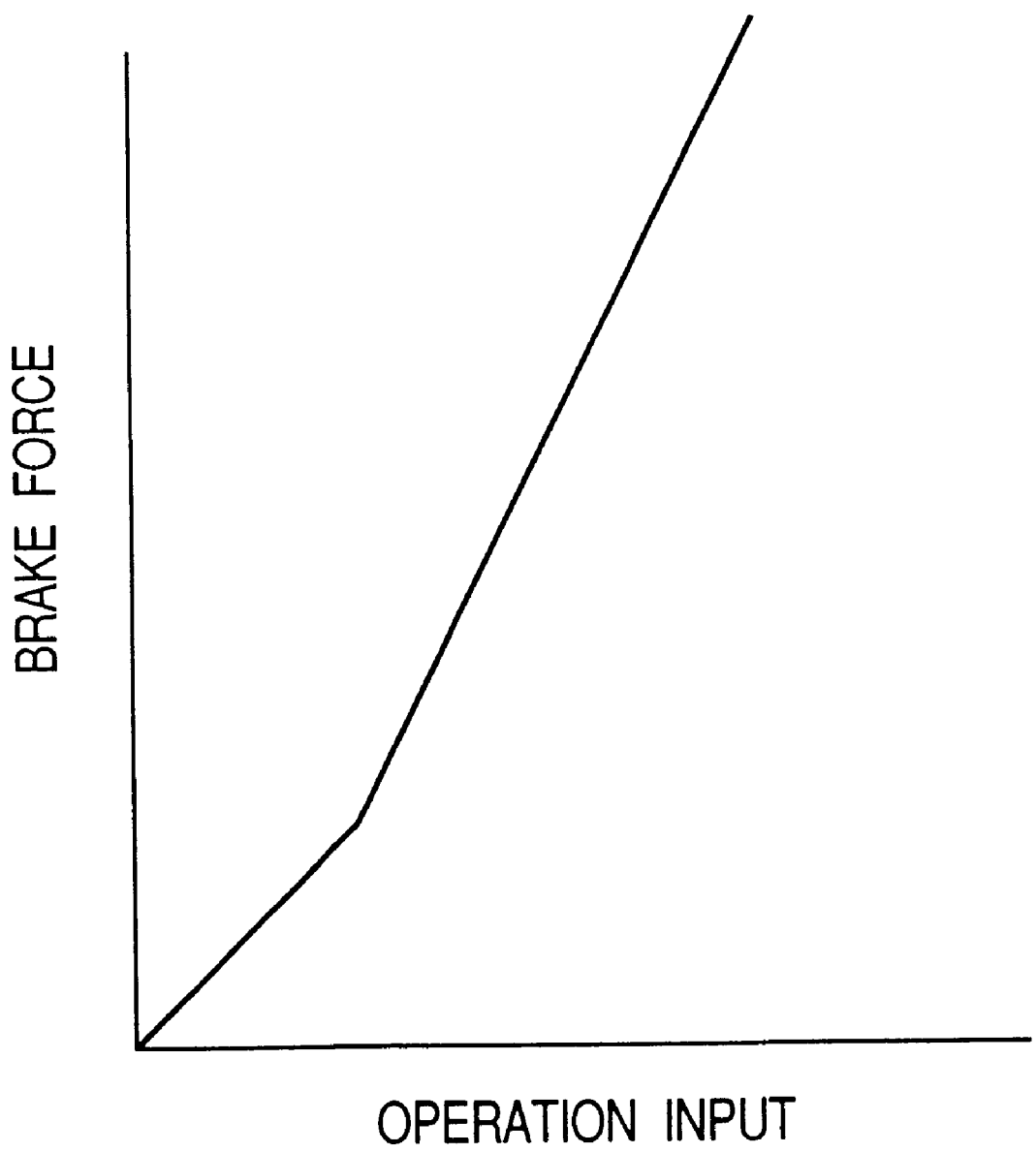
FIG. 3 is a characteristics curve of the secondary master cylinder.
Figure 4:
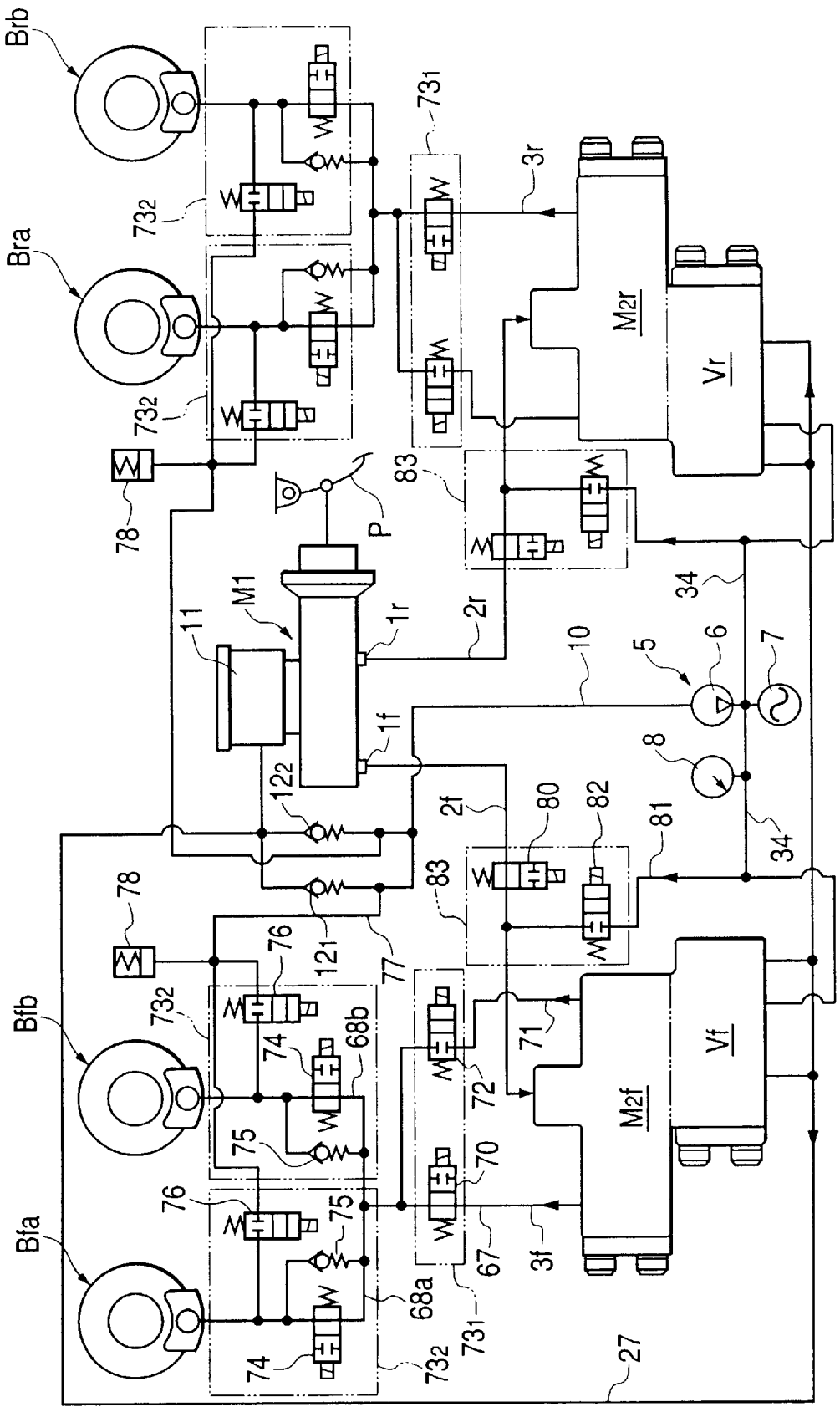
FIG. 4 is a hydraulic pressure circuit diagram of an automobile brake system equipped with hydraulic brake boosters according to a second embodiment of the present invention.

FIG. 3 shows a relationship between the input hydraulic pressure into the primary master cylinder $M_1$ by the brake pedal P and the output hydraulic pressure from the secondary master cylinder $M_2f$ during the aforesaid operation.

Furthermore, in a case where the boosting hydraulic pressure chamber 30 becomes out of order and cannot boost due to a failure in the hydraulic power source 5, the operating piston 53 of the secondary master cylinder $M_2f$ if not allowed to advance from the retracted limit position, and the relief port valve 60 is kept open. Therefore, a hydraulic pressure supplied from the primary master cylinder $M_1$ to the first input hydraulic pressure chamber $55_1$ of the front secondary master cylinder $M_2f$ is delivered to the output hydraulic pressure chamber 54 after passing through the relief port 59 which is in an opened state, whereby the front wheel brakes Bfa, Bfb can be actuated by the output hydraulic pressure from the primary master cylinder, $M_1$, whereby they can be actuated. Accordingly a fail safe is secured.

While braking, when the front wheels are about to be locked, an electronic computer(not shown) senses such a condition and closes the anti-locking controlling shut-off valve 70 and second inlet valves 74, 74, while opening the outlet valves 76, 76, and therefore the hydraulic pressure is relieved from the front wheel brakes Bfa, Bfb to the return fluid passage 27, and the hydraulic pressure reservoir 78 is caused to absorb it immediately, thereby making it possible to prevent the locking of the front left and right wheels.

When the brake fluid pressures of the front wheel brakes Bfa, Bfb become appropriate, only the outlet valves 76, 76 are closed so as to maintain the appropriate brake hydraulic pressures. In addition, when the lost brake fluid pressures need to be recovered, the first inlet valve 72 is opened while the second inlet valves 74, 74 are restored to the opened state, and the second outlet valves 76, 76 are also restored to the closed state, whereby the hydraulic pressure from the boosting hydraulic pressure chamber 30 is then supplied to the front wheel brakes Bfa, Bfb through the first inlet valve 72 and the second inlet valves 74, 74, the lost brake fluid pressures being thereby restored. Thus, the front wheel brakes Bfa, Bfb can operate efficiently without any risk of the front wheels being locked.

During the aforesaid anti-locking control, since the upstream fluid passage 67 of the main brake fluid passage 3f continues to be blocked by the anti-locking controlling shut-off valve 70, the fluid sent out by the primary master cylinder $M_1$ is prevented from being consumed unnecessarily, whereby an increase in travel of the brake pedal P when pressed down can be prevented.

While an anti-locking control as described above is carried out, since the upstream fluid passage 67 of the main brake fluid passage 3f continues to be shut off by the shut-off valve 70, neither is there a risk of a kick-back phenomenon being caused in which a hydraulic pressure change in the front wheel brakes Bfa, Bfb is transferred to the primary master cylinder $M_1$ side nor there is a risk of the fluid sent out by the primary master cylinder $M_1$ being consumed unnecessarily, an increase in travel of the brake pedal P when it is pressed down being thereby prevented.

When the hydraulic pump 6 is actuated to restore the reduced hydraulic pressure of the accumulator 7, the hydraulic pressure absorbed by the hydraulic pressure reservoir 78 is taken into the hydraulic pump 6 together with the fluid in the fluid tank 11 for supply to the accumulator 7.

Thus, since the hydraulic pump 6, which is relatively expensive, is used for not only accumulating hydraulic pressures in the accumulator 7 but also refluxing brake fluid pressures, costs can be reduced. Moreover, since the hydraulic pump 6 does not have to continue to be operated during anti-locking controlling because the hydraulic pressure reservoir 78 is provided, power consumption can be prevented as much as possible.

In addition, since the discharge fluid passage 77 having the second outlet valve 76 at a position along the length thereof is connected at the downstream end thereof to the intake fluid passage 10 between the first one-way valve $12_1$ and the hydraulic pump 6, even if the second outlet valve 7 is held open due to a failure therein, a leakage of the brake fluid pressures in the front wheel brakes Bfa, Bfb to the fluid tank 11 and the return fluid passage 27 can be prevented by the first and second one-way valves $12_1$, $12_2$.

When the operating force being applied from the brake pedal P to the primary master cylinder $M_1$ is released, the above respective valves 70, 72, 74, 76 are restored to their original states, while in the front proportional booster valve Vf, the valve piston 22 is withdrawn together with the control piston 18 by virtue of the biassing force of the return spring 23, and in conjunction with this, the inlet valve 33 is closed while the outlet valve 40 is opened, and therefore the supply of hydraulic pressures from the accumulator 7 to the boosting hydraulic pressure chamber 30 is cut off, and the hydraulic pressures of the boosting hydraulic pressure chamber 30 and the second input hydraulic pressure chamber $55_2$ of the front master cylinder $M_2f$ are returned to the fluid return passage 27 via the outlet valve 40 and then to the fluid tank 11 of the primary master cylinder.

In addition, at the same time, since the hydraulic pressure in the first input fluid pressure chamber $55_1$ of the front secondary master cylinder $M_2f$ is released to the primary master cylinder $M_1$ side, the operating piston 53 continues to reduce the pressure in the output hydraulic pressure chamber 54 while being retracted by virtue of the biassing force of the return spring 57. And, when it is retracted to its original retracted limit position, the poppet valve body 62 is received by the valve opening rod 66, and the relief port valve 60 is put in an open state, and therefore the hydraulic pressure in the output hydraulic pressure chamber 54 is released from the relief port 59 to the primary master cylinder $M_1$ side. Thus, the front wheel brakes Bfa, Bfb are restored to an inoperative state.

When the electronic control unit (not shown) closes the automatic braking outlet valve 80 and opens the inlet valve 82 while the vehicle is running, the hydraulic pressure in the accumulator 7 is delivered to the first input hydraulic pressure chamber $55_1$ of the front secondary master cylinder $M_2f$ after passing through the auxiliary input fluid pressure 81 and the downstream portion of the front input fluid passage 2f, and the hydraulic pressure so delivered is further delivered to the front wheel brakes Bfa, Bfb after passing through the relief port valve 60, which is in an opened position, and the output hydraulic pressure chamber 54 and the front brake fluid passage 3f. Thus, the front wheel brakes Bfa, Bfb can automatically be actuated. When this happens, the outlet valve 80 is closed and a leakage of the hydraulic pressure in the accumulator 7 to the primary master cylinder $M_1$ side is prevented.

Thereafter, when the inlet valve 82 and the outlet valve 80 are restored to their original states, the hydraulic pressure in the output hydraulic pressure chamber 54 of the front secondary master cylinder $M_2f$ returns to the fluid tank 11 through the outlet valve 80, which is being opened, and the interior of the primary master cylinder $M_1$. Accordingly, the front wheel brakes Bfa, Bfb can automatically be restored to the inoperative state.

Thus, since the hydraulic pressure in the accumulator 7 is used as a fluid pressure for automatic braking, the added value of the hydraulic pump 6 for accumulating pressures in the accumulator can be increased.

The rear proportional booster valve Vr and the rear secondary master cylinder $M_2r$ are also operated in a manner similar to that described above, and the rear wheel brakes Bra, Brb are also controlled in a manner similar to that in which the front wheel brakes Bfa, Bfb are.

Since three constituent elements such as the primary master cylinder $M_1$, secondary master cylinders $M_2f$, $M_2r$ and proportional booster valves Vf, Vr are connected to each other via the fluid passages, they can be placed at narrow places in the engine compartment of a vehicle. In particular, as illustrated in the drawings, the cylinder body 50 of the secondary master cylinder $M_2f$, $M_2r$ and the casing 13 of the proportional booster valve Vf, Vr are made integral with each other so as for them to be disposed in parallel with each other, and this is convenient to provide a simplified and compact construction.

[Second Embodiment]

Next, a second embodiment of the present invention will be described with reference to FIGS. 4 to 7.

Figure 5:
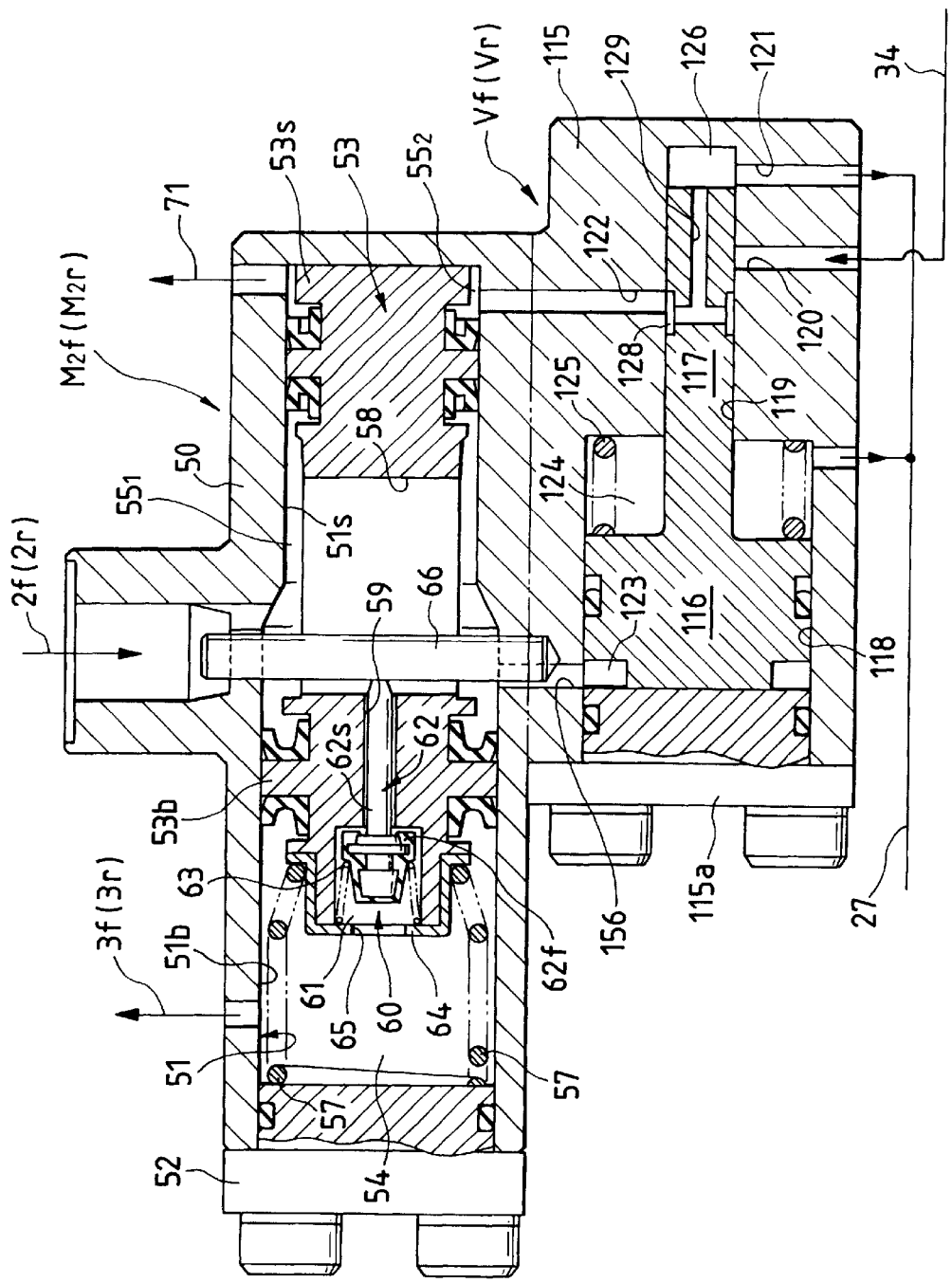
FIG. 5 is an enlarged longitudinal sectional view of a proportional booster valve and a secondary master cylinder shown in FIG. 4.
Figure 6:
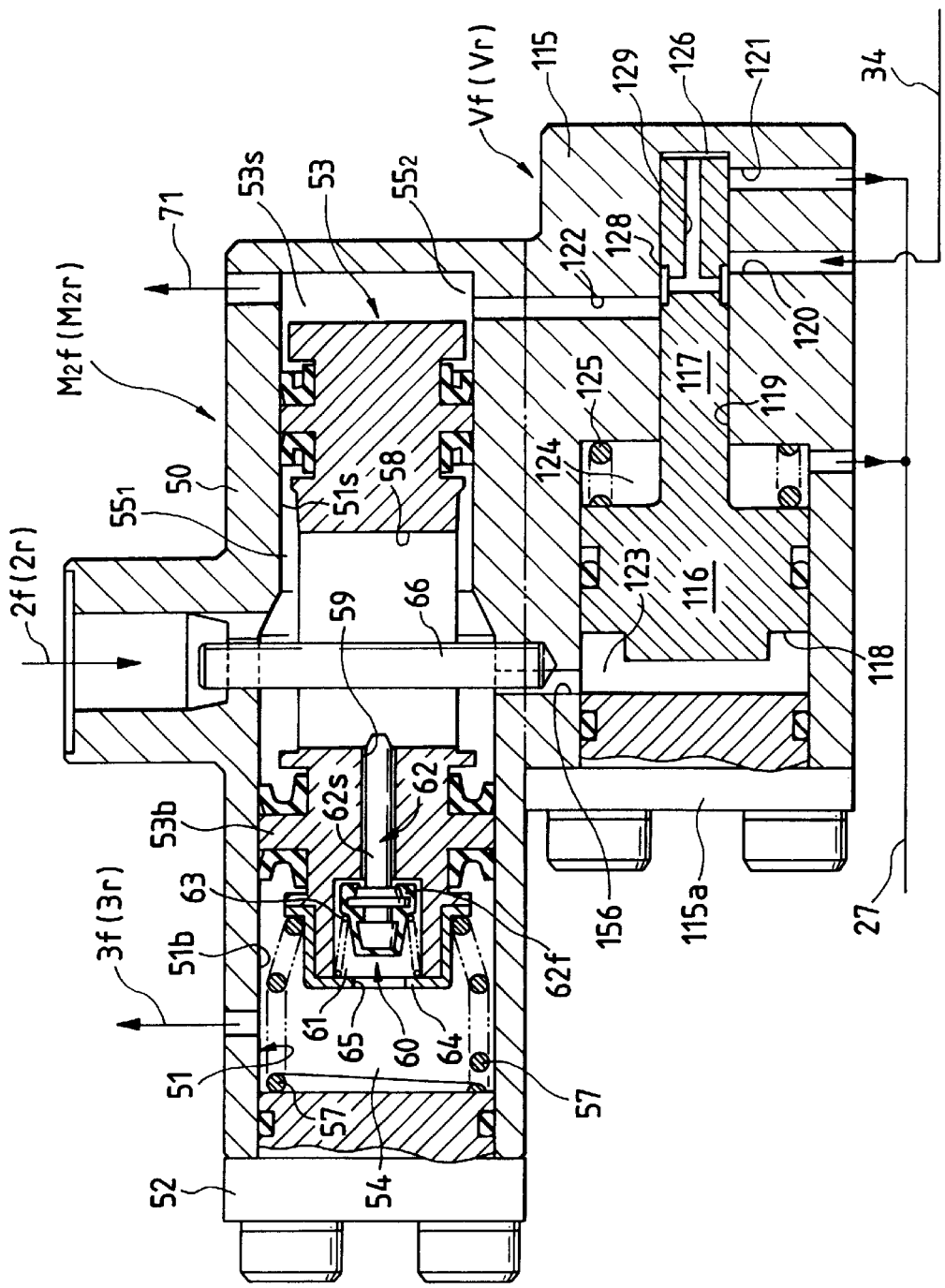
FIG. 6 is an explanatory view of a booster function of the proportional booster valve shown in FIG. 5.

In the second embodiment, as shown in FIG. 5, the front proportional booster valve Vf includes, as main constituent elements, a valve housing 115, a control piston 116 and a spool valve body 117. The valve housing 115 has a bottomed cylinder bore 118 which is made open at one end thereof and a bottomed valve bore 119 which is coaxially continuous with the cylinder bore 118 at the inner end of the cylinder bore 118. The valve bore 119 is formed sufficiently smaller than the cylinder bore 118 in diameter. Open to an inner circumferential surface of the valve bore 119 are a hydraulic power source port 120 communicating with the accumulator 7, a return port 121 communicating with the fluid tank 11 and a booster port 122 communicating with a second input hydraulic pressure chamber $55_2$ of the front secondary master cylinder $M_2f$. The control piston 116 is slidably fitted in the cylinder bore 118, and a lid body 115a is secured to the valve housing 115 for closing the open end face of the cylinder bore 118. The cylinder bore 118 is partitioned by the control valve 116 into a controlling hydraulic pressure chamber 123 on the lid body 115a side and an atmospheric pressure chamber 124 on the opposite side, and the controlling hydraulic pressure chamber 123 is connected to the front input fluid passage 2f via a fluid passage 156 and a first input hydraulic pressure chamber $55_1$ of the front secondary master cylinder $M_2f$, which will be described later. However, the controlling hydraulic pressure chamber 123 and the front input fluid passage 2f may directly be connected to each other.

A return spring 125 is accommodated in the atmospheric pressure chamber 124 for biassing the control piston 116 toward the controlling hydraulic pressure chamber 123. The atmospheric pressure chamber 124 is connected to a return fluid passage 27, and this return fluid passage 27 is connected at a downstream end thereof to the intake fluid passage 10 between the first and second one-way valves 121, 122 and the fluid tank 11.

The spool valve body 117 is coupled integrally to the control piston 116 and is slidably fitted in the valve bore 119. A reaction force chamber 126 is formed between a distal end of the spool valve body 117 and an inner end wall of the confronting valve bore 119. This spool valve body 117 includes an annular groove 128 surrounding an outer circumference thereof and a T-shaped communicating hole 129 formed so as to establish a communication between the annular groove 128 and the reaction force chamber 126. In a retracted position of the control piston 116 (a state shown in FIG. 5) where the control piston 116 is brought into abutment with the lid body 115a, the spool valve body 117 is constructed so as to close the hydraulic power source port 120 while establishing a communication between the return port 121 and the booster port 122 via the annular groove 128, the communicating hole 129 and the reaction force chamber 126. On the other hand, in an advanced position of the control piston 116 (a state shown in FIG. 6) where the spool valve body 117 is brought into abutment with the inner end of the valve bore 119, the spool valve body 117 is constructed so as to close the return port 121, while establishing a communication between the hydraulic power source port 120 and the booster port 122 via the annular groove 128 and the communicating hole 129. Further, in an intermediate position of the control piston 116 (a state shown in FIG. 7), the spool valve body 117 is constructed so as to close both the hydraulic power source port 120 and the return port 122, and the reaction force chamber 126 is caused to communicate with the booster port 122 at all times via the communicating hole 129 and the annular groove 128.

The other constructions remain the same as those in the first embodiment and in the figure like numerals are given to portions corresponding to those in the first embodiment and descriptions thereof will be omitted.

Next, an operation of this embodiment will be explained.

A hydraulic pressure outputted from the front and rear output ports 1f, 1r of the primary master cylinder M1 when the brake pedal P is pressed down is supplied to the first input hydraulic pressure chambers $55_1$ of the front and rear secondary master cylinders $M_2f$, $M_2r$ and the controlling hydraulic pressure chambers 23 of the front and rear proportional booster valves. Vf, Vr.

The hydraulic pressure supplied to the first input hydraulic pressure chamber $55_1$ of the front secondary master cylinder $M_2f$ is delivered to the front wheel brakes Bfa, Bfb after passing through the relief port valve 60 in an opened state, the output hydraulic pressure chamber 54 and the front main brake fluid passage 3f in that order and actuates them in a normal way.

On the other hand, when the hydraulic pressure supplied to the controlling hydraulic pressure chamber 123 of the front proportional booster valve Vf reaches or exceeds a predetermined value regulated by a set load of the return spring 125, the control piston 116 advances together with the spool valve body 117 while compressing the return spring 125 by virtue of the hydraulic pressure so supplied. When it reaches an advanced position (refer to FIG. 6) where the spool valve body 117 abuts with the inner end wall of the valve bore 119, since the spool valve body 117 establishes a communication between the hydraulic power source port 120 and the booster port 122, a hydraulic pressure in the accumulator 7 is delivered to the second input hydraulic pressure chamber $55_2$ of the front secondary master cylinder $M_2f$ after passing through the hydraulic power source port 120 and the booster port 122, and further presses against the small-diameter piston portion 53s of the operating piston 53, whereby the operating piston 53 is caused to advance. When the operating piston 53 advances, as described above, since the relief port valve 60 is closed immediately, a hydraulic pressure is generated in the output hydraulic pressure chamber 54 as the operating piston 53 advances. The hydraulic pressure so generated is then outputted to the front main brake fluid passage 3f so as to be delivered to the front wheel brakes Bfa, Bfb, whereby they are boost actuated.

Now, since the booster port 122 and the reaction force chamber 126 are normally communicated by the spool valve body 117, a hydraulic pressure which is equal to the hydraulic pressure outputted from the booster port 122 is applied to the reaction force chamber 126. The hydraulic pressure so applied then acts on the distal end face of the spool valve body 117 and this generates a reaction force that pushes the control piston 116 in a retracting direction. When the reaction force so generated is larger than the pressing force of the control piston 116 resulting from the hydraulic pressure in the controlling hydraulic pressure chamber 123, the control piston 116 starts to retract together with the spool valve body 117.

Figure 7:
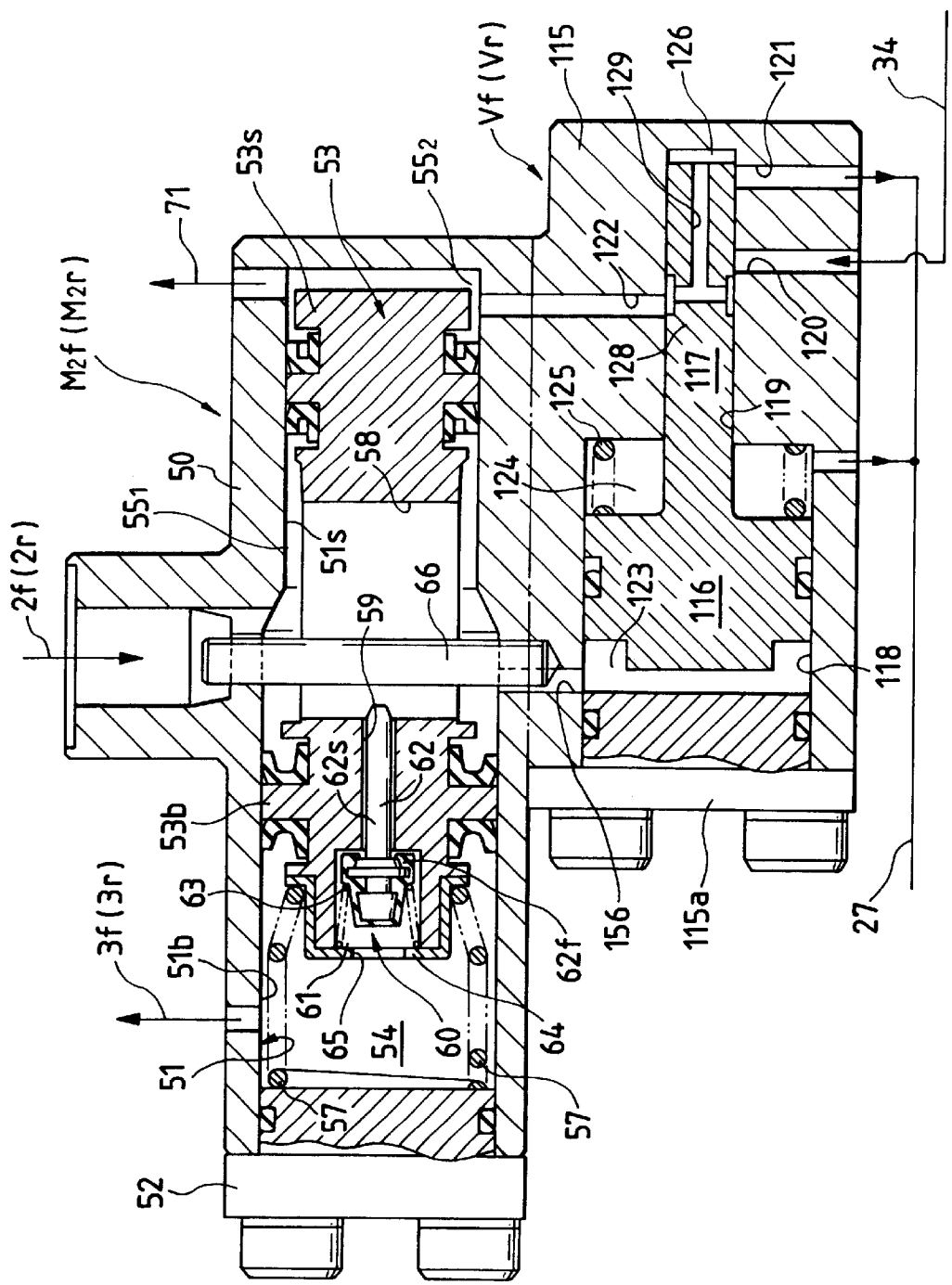
FIG. 7 is an explanatory view of a hydraulic pressure holding function of the proportional booster valve shown in FIG. 5.

Thus, when the control piston 116 reaches an intermediate position as shown in FIG. 7, since the spool valve body 117 closes both the hydraulic power source port 120 and the return port 121, the hydraulic pressure in the second input hydraulic pressure chamber $55_2$ of the front secondary master cylinder $M_2f$ is held as it is.

Furthermore, when the control piston 116 returns to a retracted position as shown in FIG. 5, since the spool valve body 117 establishes a communication between the return port 121 and the booster port 122, the hydraulic pressure in the second input hydraulic pressure chamber $55_2$ is discharged into the fluid tank 11 through the return port 121 and the booster port 122, this producing a reduced pressure state.

In conjunction with the pressure reduction in the second input hydraulic pressure chamber $55_2$, in other words, the reaction force chamber 126, the control piston 116 advances again by virtue of the hydraulic pressure in the controlling hydraulic pressure chamber 123, and when the spool valve body 117 again establishes a communication between the hydraulic power source port 120 and the booster port 122, the hydraulic pressure is also started to be supplied from the accumulator 7 to the second input hydraulic pressure chamber $55_2$.

Thus, the second input hydraulic pressure chamber $55_2$ is controlled so as to be boosted in proportion to the hydraulic pressure in the controlling hydraulic pressure chamber 123, or the output hydraulic pressure of the primary master cylinder $M_1$ by repeating the operations as described above.

During those operations, the hydraulic pressure in the reaction force chamber 126 continues to impart a reaction force to the control piston 116 via the spool valve body 117, and since it is hydraulically fed back to the brake pedal P, the operator can sense the magnitude of the output hydraulic pressure from the booster port 122, in other words, a braking force, whereby he or she can feel the brakes operating properly.

In addition, the operating piston 53 in the front secondary master cylinder $M_2f$ includes a large-diameter piston portion 53b on a front side and a small-diameter piston portion 53s on a rear side, and a hydraulic pressure, i.e., the output hydraulic pressure from the primary master cylinder $M_1$ is received by confronting surfaces of those large-diameter and small-diameter piston portions or the first input hydraulic pressure chamber $55_1$. Thus, in a state in which the relief port valve 60 is closed, a thrust force obtained by multiplying a difference in area between the confronting surfaces of those piston portions by the hydraulic pressure in the first input hydraulic pressure chamber $55_1$ is additionally applied to the operating piston 53, this contributing to boosting a hydraulic pressure generated in the output hydraulic pressure chamber 54.

FIG. 3 shows a relationship between the input hydraulic pressure into the primary master cylinder $M_1$ by the brake pedal P and the output hydraulic pressure from the secondary master cylinder $M_2f$ during the aforesaid operation.

Furthermore, in a case where the booster port 122 becomes out of order and hence outputs no hydraulic pressure therefrom due to a failure in the hydraulic power source 5, the operating piston 53 of the secondary master cylinder $M_2f$, is not allowed to advance from the retracted limit position, and the relief port valve 60 is kept open. Therefore, a hydraulic pressure supplied from the primary master cylinder $M_1$ to the first input hydraulic pressure chamber $55_1$ of the front secondary master cylinder $M_2f$ is delivered to the output hydraulic pressure chamber 54 after passing through the relief port 59 which is in an opened state, and it is further delivered therefrom to the front wheel brakes Bfa, Bfb, whereby they can be actuated, whereby a fail safe is secured.

While braking, when the front wheels are about to be locked, an electronic computer(not shown) senses such a condition and closes the anti-locking controlling shut-off valve 70 and second inlet valves 74, 74, while opening the outlet valves 76, 76, and therefore the hydraulic pressure is relieved from the front wheel brakes Bfa, Bfb to the return fluid passage 27, and the hydraulic pressure reservoir 78 is caused to absorb it immediately, thereby making it possible to prevent the locking of the front left and right wheels.

When the brake fluid pressures of the front wheel brakes Bfa, Bfb become appropriate, only the outlet valves 76, 76 are closed so as to maintain the appropriate brake hydraulic pressures. In addition, when the lost brake fluid pressures need to be recovered, the first inlet valve 72 is opened while the second inlet valves 74, 74 are restored to the opened state, and the second outlet valves 76, 76 are also restored to the closed state, whereby the output hydraulic pressure from the booster port 22 is then supplied to the front wheel brakes Bfa, Bfb through the first inlet valve 72 and the second inlet valves 74, 74, the lost brake fluid pressures being thereby restored. Thus, the front wheel brakes Bfa, Bfb can operate efficiently without any risk of the front wheels being locked.

During the aforesaid anti-locking control, since the upstream fluid passage 67 of the main brake fluid passage 3f continues to be blocked by the anti-locking controlling shut-off valve 70, a kick-back phenomenon in which a change in the hydraulic pressure in the front wheel brakes Bfa, Bfb is transferred to the primary master cylinder $M_1$ side is prevented from occurring, and moreover the fluid sent out by the primary master cylinder $M_1$ is prevented from being consumed unnecessarily, whereby an increase in travel of the brake pedal P when pressed down can be prevented.

When the hydraulic pump 6 is actuated to restore the reduced hydraulic pressure of the accumulator 7, the hydraulic pressure absorbed by the hydraulic pressure reservoir 78 is taken into the hydraulic pump 6 together with the fluid in the fluid tank 11 for supply to the accumulator 7.

Thus, since the hydraulic pump 6, which is relatively expensive, is used for not only accumulating hydraulic pressures in the accumulator 7 but also refluxing brake fluid pressures, costs can be reduced. Moreover, since the hydraulic pump 6 does not have to continue to be operated during anti-locking controlling because the hydraulic pressure reservoir 78 is provided, power consumption can be prevented as much as possible.

In addition, since the discharge fluid passage 77 having the second outlet valve 76 at a position along the length thereof is connected at the downstream end thereof to the intake fluid passage 10 between the first one-way valve 121 and the hydraulic pump 6, even if the second outlet valve 7 is held open due to a failure therein, a leakage of the brake fluid pressures in the front wheel brakes Bfa, Bfb to the fluid tank 11 and the return fluid passage 27 can be prevented by the first and second one-way valves $12_1$, $12_2$.

When an operation force applied to the primary master cylinder $M_1$ by the brake pedal P is released, the above respective valves 70, 72, 74, 76 are restored to their original states, while in the front proportional booster valve Vf, the control piston 116 is retracted together with the spool valve body by virtue of the biassing force of the return spring 125. In conjunction with this, the hydraulic power source port 120 is closed while a communication is established between the booster port 122 and the return port 121. This cuts off a supply of hydraulic pressure from the accumulator 7 to the booster port 22 and the hydraulic pressure in the second input fluid pressure chamber $55_2$ of the front secondary master cylinder $M_2f$ is returned to the fluid tank 11 of the primary master cylinder $M_1$.

In addition, at the same time, since the hydraulic pressure in the first input fluid pressure chamber $55_1$ of the front secondary master cylinder $M_2f$ is released to the primary master cylinder $M_1$ side, the operating piston 53 continues to reduce the pressure in the output hydraulic pressure chamber 54 while being retracted by virtue of the biassing force of the return spring 57. And, when it is retracted to its original retracted limit position, the poppet valve body 62 is received by the valve opening rod 66, and the relief port valve 60 is put in an open state, and therefore the hydraulic pressure in the output hydraulic pressure chamber 54 is released from the relief port 59 to the primary master cylinder $M_1$ side. Thus, the front wheel brakes Bfa, Bfb are restored to an inoperative state.

When the electronic control unit (not shown) closes the automatic braking outlet valve 80 and opens the inlet valve 82 while the vehicle is running, the hydraulic pressure in the accumulator 7 is delivered to the first input hydraulic pressure chamber $55_1$ of the front secondary master cylinder $M_2f$ after passing through the auxiliary input fluid pressure 81 and the downstream portion of the front input fluid passage 2f, and the hydraulic pressure so delivered is further delivered to the front wheel brakes Bfa, Bfb after passing through the relief port valve 60, which is in an opened position, and the output hydraulic pressure chamber 54 and the front brake fluid passage 3f. Thus, the front wheel brakes Bfa, Bfb can automatically be actuated. When this happens, the outlet valve 80 is closed and a leakage of the hydraulic pressure in the accumulator 7 to the primary master cylinder $M_1$ side is prevented.

Thereafter, when the inlet valve 82 and the outlet valve 80 are restored to their original states, the hydraulic pressure in the output hydraulic pressure chamber 54 of the front secondary master cylinder $M_2f$ returns to the fluid tank 11 through the outlet valve 80, which is being opened, and the interior of the primary master cylinder M1. Accordingly, the front wheel brakes Bfa, Bfb can automatically be restored to the inoperative state.

Thus, since the hydraulic pressure in the accumulator 7 is used as a fluid pressure for automatic braking, the added value of the hydraulic pump 6 for accumulating pressures in the accumulator can be increased.

The rear proportional booster valve Vr and the rear secondary master cylinder $M_2r$ are also operated in a manner similar to that described above, and the rear wheel brakes Bra, Brb are also controlled in a manner similar to that in which the front wheel brakes Bfa, Bfb are.

Since three constituent elements such as the primary master cylinder $M_1$, secondary master cylinders $M_2f$, $M_2r$ and proportional booster valves Vf, Vr are connected to each other via the fluid passages, they can be placed at narrow places in the engine compartment of a vehicle. In particular, as illustrated in the drawings, the cylinder body 50 of the secondary master cylinder $M_2f$, $M_2r$ and the valve housing 15 of the proportional booster valve Vf, Vr are made integral with each other so as for them to be disposed in parallel with each other, and this is convenient to provide a simplified and compact construction.

In addition, since the proportional booster valve Vf, Vr includes the valve housing 15, the control piston 16 and the spool valve body 17, it can be constructed simply with a limited number of components, and hence it can be provided inexpensively.

[Third Embodiment]

Figure 8:
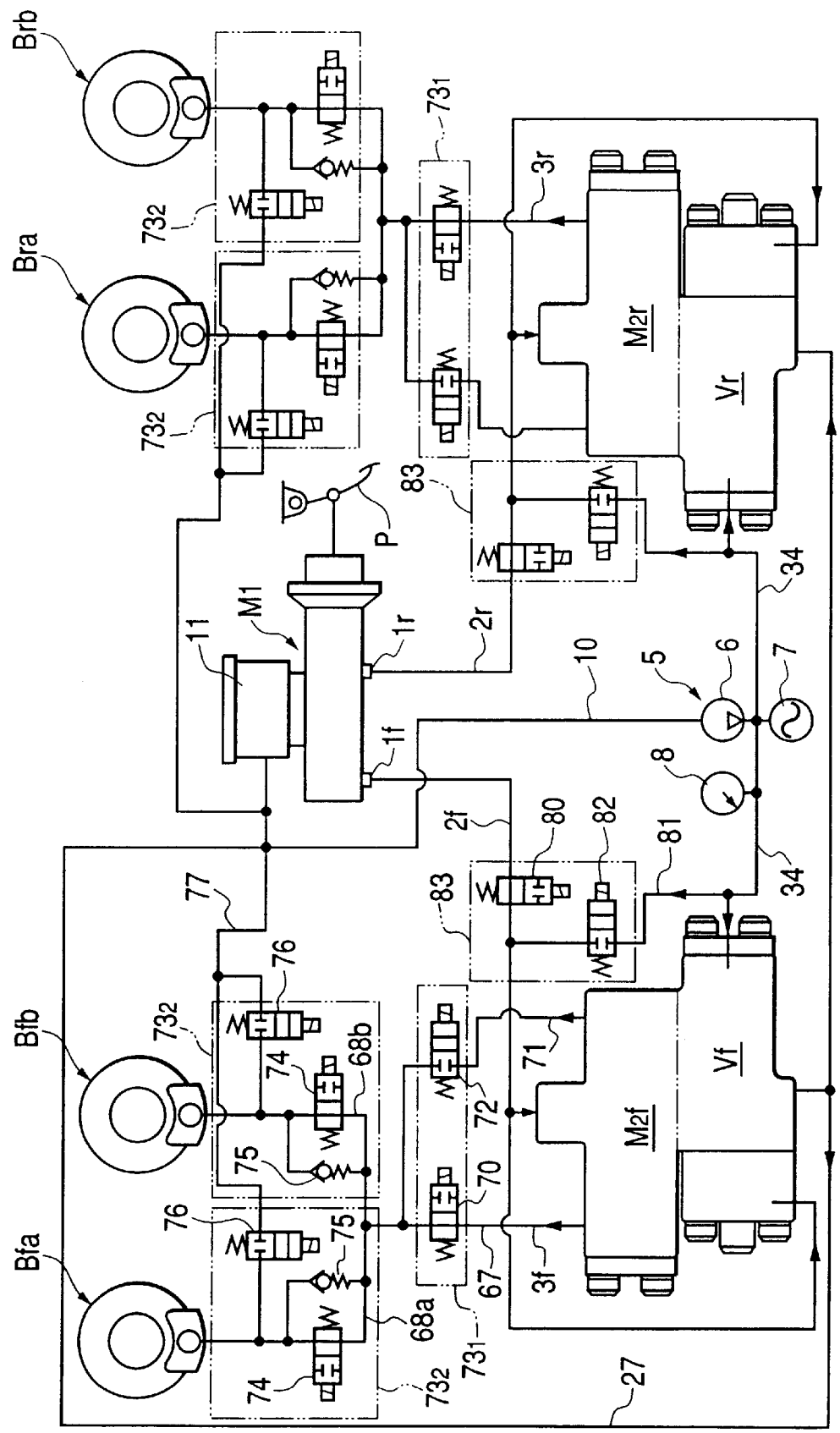
FIG. 8 is a hydraulic pressure circuit diagram showing a third embodiment of the present invention, the diagram corresponding to FIG. 1.
Figure 9:
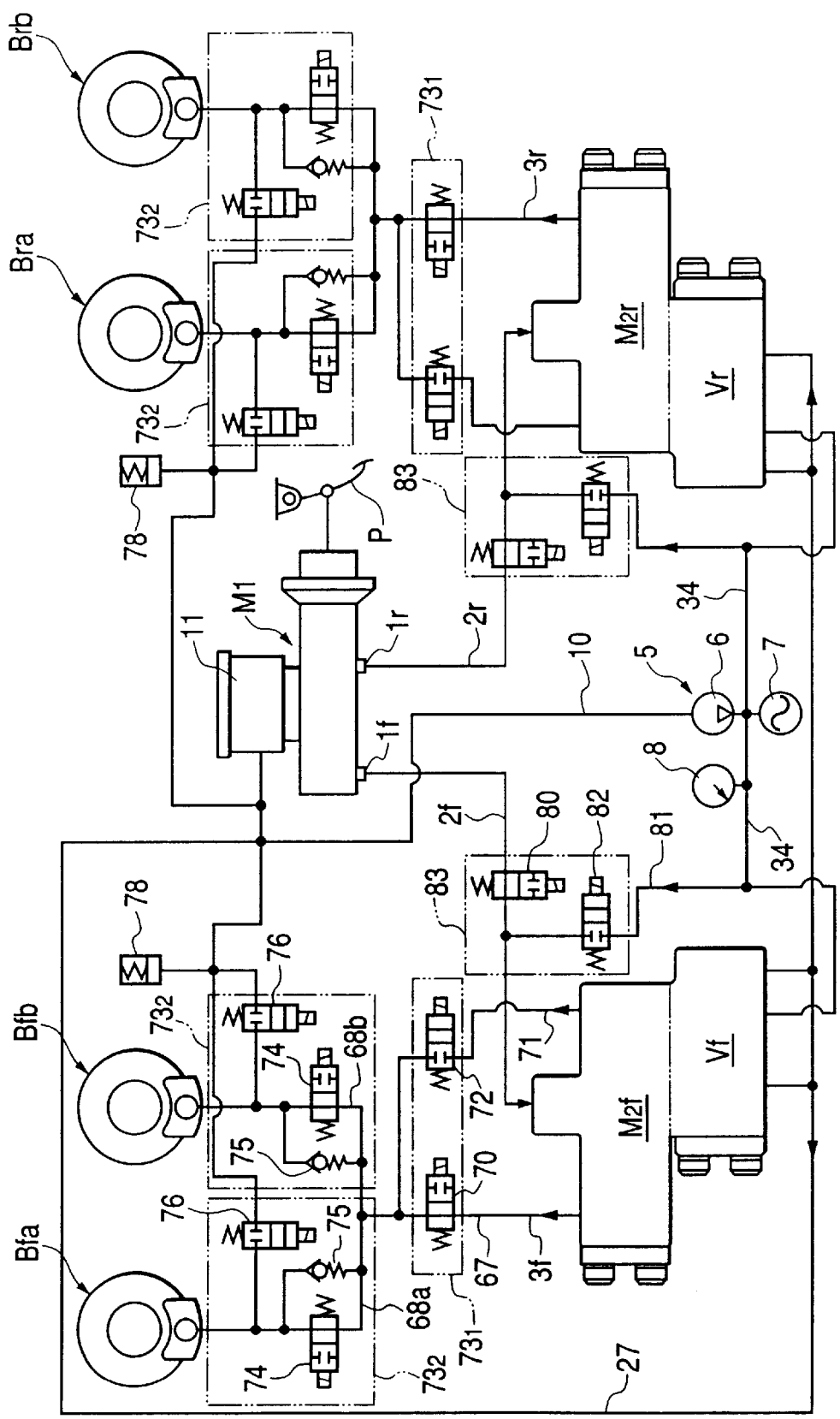
FIG. 9 is a hydraulic pressure circuit diagram showing the third embodiment of the present invention, the diagram corresponding to FIG. 4.

Next, referring to FIGS. 8 and 9, a third embodiment of the present invention will be described.

In this third embodiment, the return fluid passage 27 and the discharge fluid passage 77 are directly connected to the fluid tank 11 of the primary master cylinder $M_1$ at their downstream ends, and the first and second one-way valves $12_1$, $12_2$ and the hydraulic pressure reservoir 78 are excluded with a view to simplifying the construction. FIG. 8 is a hydraulic pressure circuit diagram of a brake system that this construction is applied to the first embodiment, and FIG. 9 is a hydraulic pressure circuit diagram of a brake system that this construction is applied to the second embodiment. The remaining constructions remain the same as those of the previous embodiments and in the figure portions corresponding to those in the previous embodiments are given to like reference numerals and descriptions thereof will be omitted.

[Fourth Embodiment]

Figure 10:
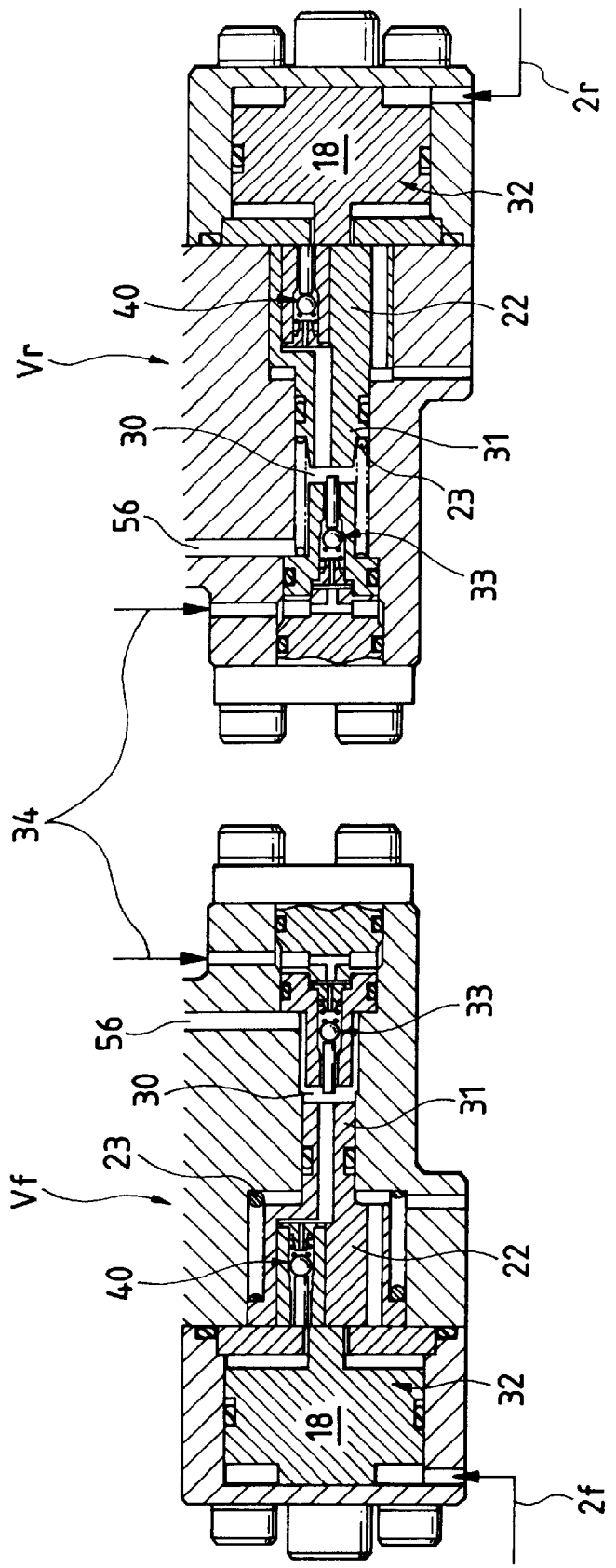
FIG. 10 is a longitudinal sectional view of a hydraulic brake booster according to a fourth embodiment of the present invention, the view being a modification of FIG. 1.
Figure 11C:
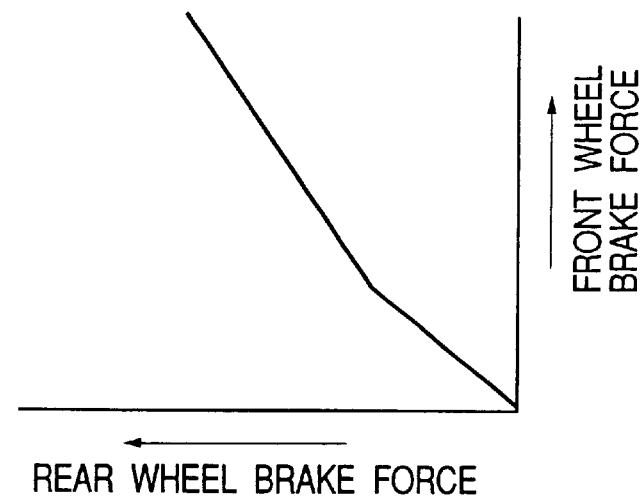
FIG. 11C is a brake force distribution characteristics curve between front and rear wheel brakes.
Figure 11B:
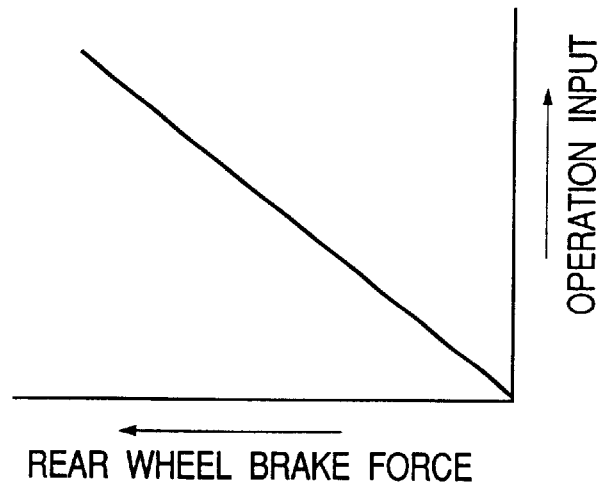
FIG. 11B is a characteristics curve of a rear secondary master cylinder.
Figure 11A:
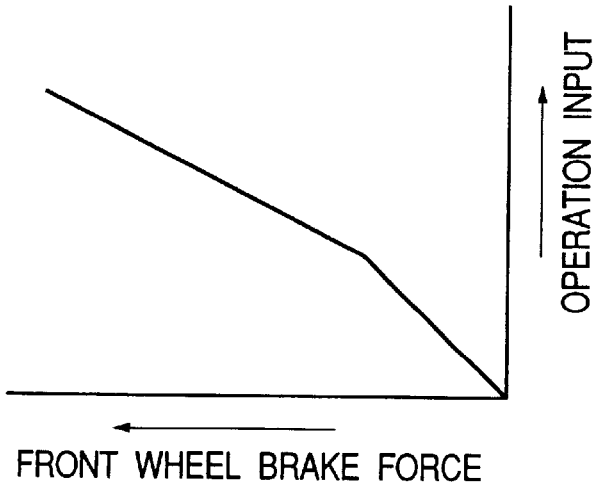
FIG. 11A is a characteristics curve of a front secondary master cylinder.
Figure 12:
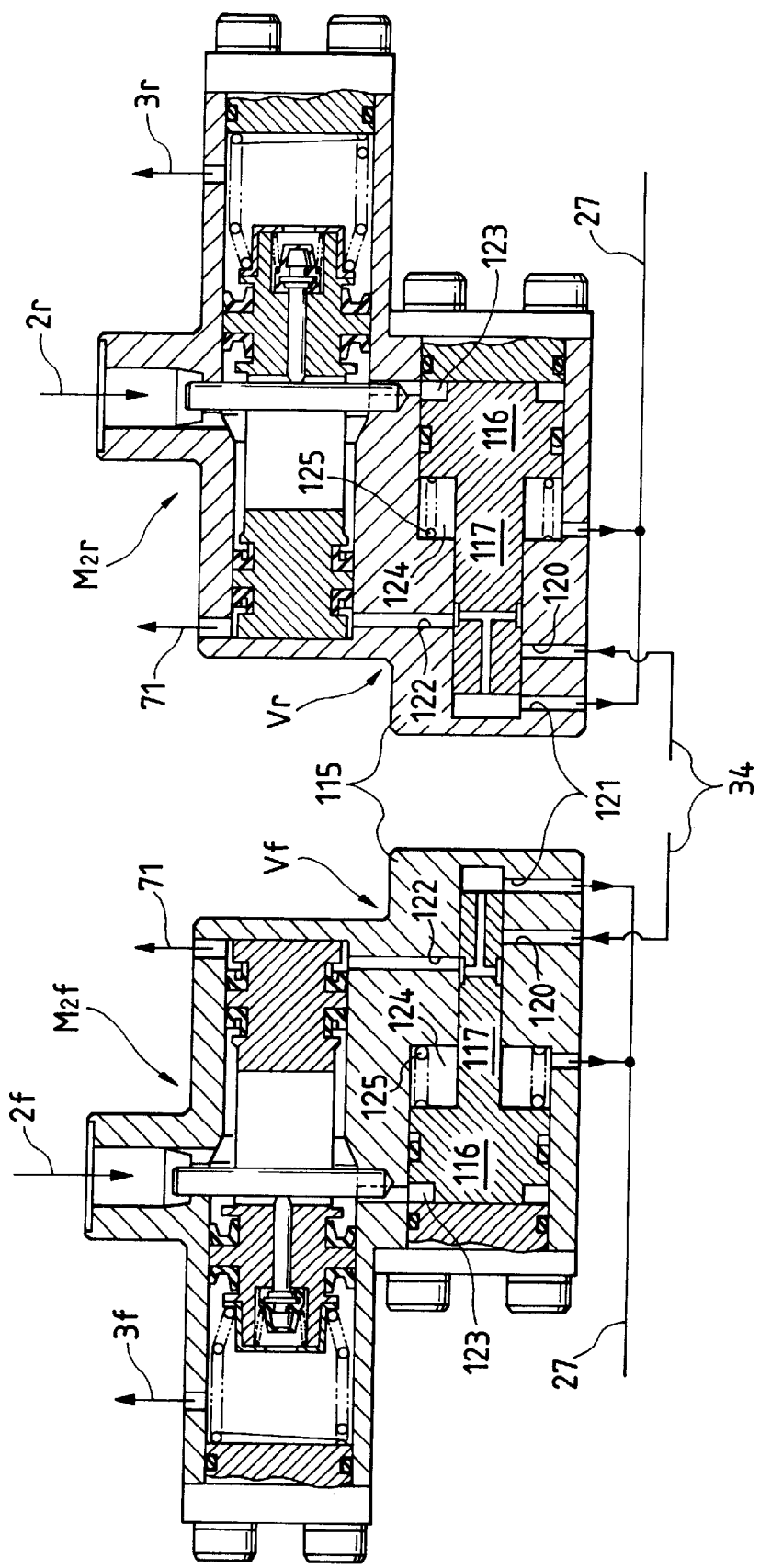
FIG. 12 is a longitudinal sectional view of a hydraulic brake booster according to the fourth embodiment of the present invention, the view being a modification of FIG. 4.

Referring to FIGS. 10 to 12, a fourth embodiment of the present invention will next be described below.

As shown in FIG. 10, in the rear proportional booster valve Vr, the set load of the return spring 23 of the valve piston 22 is set far smaller than that of the return spring 23 of the front proportional booster valve Vf, and the diameter of the reaction force piston 31 of the rear proportional booster valve Vr is made larger than that of the reaction force piston 31 of the front proportional booster valve Vf. The remaining constructions of the fourth embodiment are similar to those of the first embodiment, and therefore in the figure, like reference numerals are imparted to portions like or corresponding to portions described in the first embodiment, and descriptions thereof will be omitted.

With the construction as described above, since the front proportional booster valve Vf operates in the same manner as described in the previous embodiment, the output characteristics of the front secondary master cylinder $M_2f$ become identical to that of the first embodiment as shown in FIG. 11A. On the other hand, since the rear proportional booster valve Vr starts to operate substantially immediately after the primary master cylinder $M_1$ starts to operate, as shown in FIG. 11B, the output hydraulic pressure of the rear secondary master cylinder $M_2r$ is controlled to be boosted in proportion to inputs from the primary master cylinder $M_1$ substantially from the time when the primary master cylinder $M_1$ starts to operate. As a result of this, a relationship between the output hydraulic pressure of the front secondary master cylinder $M_2f$ and that of the rear secondary master cylinder $M_2r$ becomes as shown in FIG. 11C, and the brake force can be distributed between the front wheel brakes Bfa, Bfb and the rear wheel brakes, Bra, Brb with a desired distribution ratio from the viewpoints of brake efficiency.

Further, in FIG. 12, which is a modification of the proportional booster valve of the second embodiment, the set load for the return spring 125 of the rear proportional booster valve Vr is set much smaller than that for the return spring 125 of the front proportional booster valve Vf. In addition, the spool valve body 117 of the rear proportional booster valve Vr is formed larger in diameter than the spool valve body 117 of the front proportional booster valve Vf. Thus, a ratio between the area presented to the pressure of the spool valve 117 facing to the reaction force chamber 126 and that of the control piston 116 facing to the controlling hydraulic pressure chamber 123 of the rear proportional booster valve Vr is set larger than a ratio between the area presented to the pressure of the spool valve body 117 facing to the reaction force chamber 126 and that of the control piston 116 facing to the controlling hydraulic pressure chamber 123.

The other constructions remain the same as those in the second embodiment and in the figure like numerals are given to portions corresponding to those in the second embodiment and descriptions thereof will be omitted.

Thus, since the front proportional booster valve Vf operates in the same manner as that in the second embodiment, the output characteristics of the front secondary master cylinder $M_2f$ become the same as those of the second embodiment, which are shown in FIG. 11A. On the other hand, since the set load of the return spring 125 of the rear proportional booster valve Vr is extremely small, the control piston 116 is actuated substantially at the same time as the start of the primary master cylinder $M_1$ so as to output a boosting hydraulic pressure from the booster port 122. Therefore, as shown in FIG. 11B, the output hydraulic pressure of the rear secondary master cylinder $M_2r$ is controlled to be boosted in proportion to an input from the primary master cylinder $M_1$ substantially after the primary master cylinder $M_1$ starts to be actuated. Moreover, since the ratio between the area presented to the pressure of the spool valve body 117 and that of the control piston 116 of the rear proportional booster valve Vr is set larger than the ratio between the area presented to the pressure of the spool valve body 117 and that of the control piston 116 of the rear proportional booster valve Vf, an increasing gradient of the boosting hydraulic pressure outputted from the rear proportional booster valve Vr becomes less acute than that of the boosting hydraulic pressure outputted from the front proportional booster valve Vf. As a result of this, the relationship between the output hydraulic pressure from the front secondary master cylinder $M_2f$ and that from the rear secondary master cylinder $M_2r$ becomes as shown in FIG. 11C, and the brake force distribution between the front wheel brakes Bfa, Bfb and the rear wheel brakes Bra, Brb can be performed with a desirable efficiency without using a special proportional pressure reduction valve.

[Fifth Embodiment]

Next, referring to FIGS. 13 and 14, a fifth embodiment will be explained.

In the front and rear secondary master cylinders $M_2f$, $M_2r$, an intermediate piston portion 53m is formed on the operating piston 53 between the front large-diameter piston portion 53b and the rear small-diameter piston portion 53s. The intermediate piston portion 53m has a diameter identical to that of the large-diameter piston portion 53b. In other words, the diameter of the small-diameter piston portion 53s is made smaller than that of the intermediate piston portion 53m. Defined respectively in the cylinder bore 51 of the cylinder body 50 are the supply fluid chamber 85 between the large-diameter piston portion 53b and the intermediate piston portion 53, the first input fluid pressure chamber $87_1$ between the intermediate piston portion 53m and the small-diameter piston portion 53s, and the second input hydraulic pressure chamber $87_2$ between the small-diameter piston portion 53s and the rear end wall of the cylinder bore 51. The fluid tank 11 is connected to the supply fluid chamber 85 via a supply oil passage 86, and the supply fluid chamber 85 is caused to communicate with the output hydraulic pressure chamber 54 via the relief port valve 60. In FIG. 13, which is a modification of the first embodiment, the boosting hydraulic pressure chamber 30 of the proportional booster valve Vf, Vr is caused to communicate with one (in the illustrated example, the first input hydraulic chamber $87_1$) of the first and second input hydraulic pressure chambers $87_1$, $87_2$ via the communication hole 56 and the input fluid passage 2f, 2r extending from the primary master cylinder $M_1$ is caused to communicate with the other (in the illustrated example, the second input hydraulic pressure chamber $87_2$). On the other hand, in FIG. 14, which is a modification of the second embodiment, The booster port 22 of the proportional booster valve Vf, Vr is caused to communicate with one (in the illustrated example, the first input hydraulic chamber $87_1$) of the first and second input hydraulic pressure chambers $87_1$, $87_2$ and the input fluid passage 2f, 2r extending from the primary master cylinder $M_1$ is caused to communicate with the other (in the illustrated example, the second input hydraulic pressure chamber $87_2$). In FIG. 14, the controlling hydraulic pressure chamber 123 of the proportional booster valve Vf, Vr is connected to the input fluid passage 2f, 2r via the fluid passage 86 and the first input hydraulic pressure chamber $87_1$. In this case, too, the controlling hydraulic pressure chamber 123 may directly be connected to the input fluid passage 2f, 2r.

The remaining constructions of this embodiment are the same as those of the first or second embodiment, and therefore in the figure like reference numerals are given to like portions of the first or second embodiment and descriptions thereof will be omitted.

Figure 13:
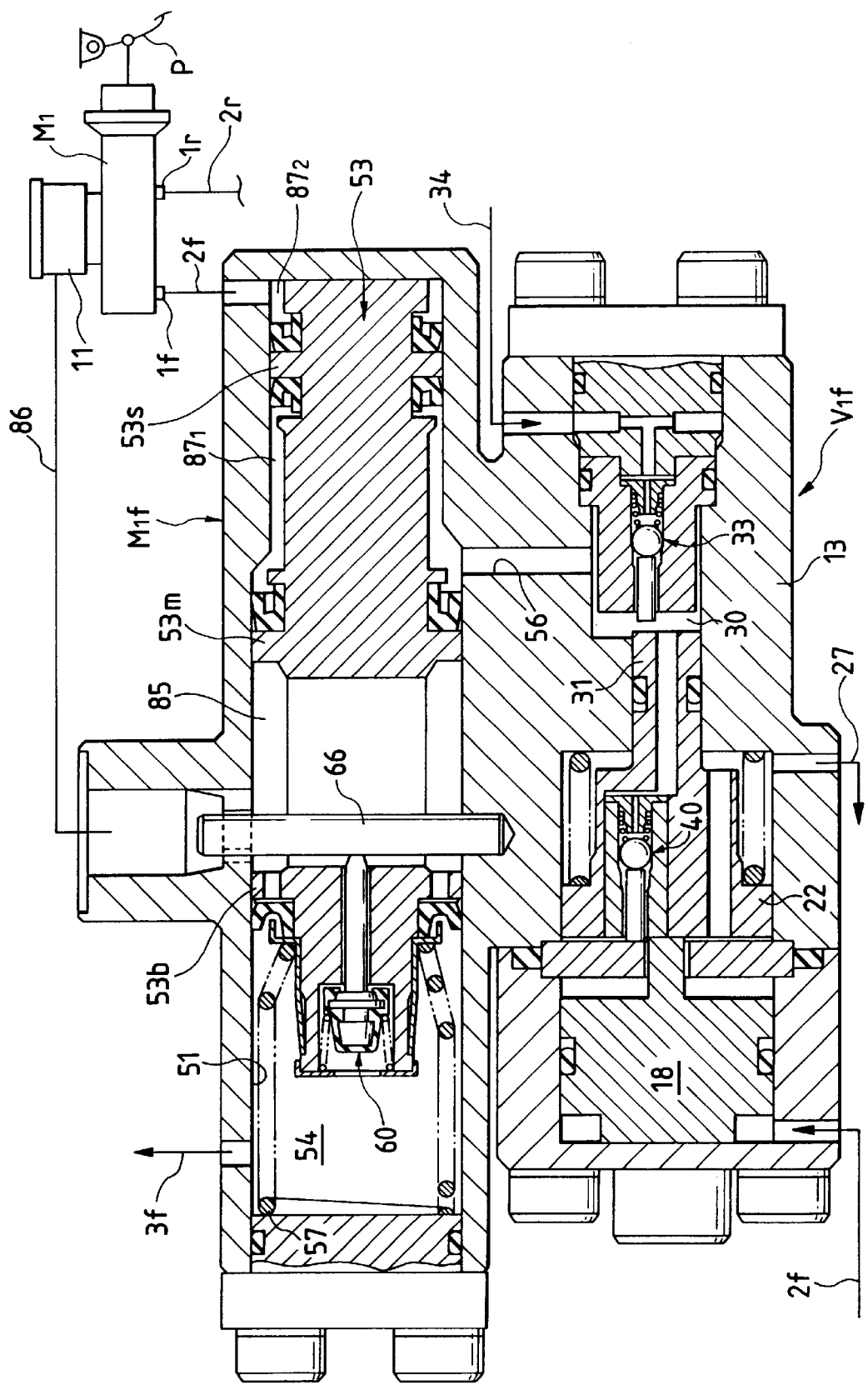
FIG. 13 is a longitudinal sectional view of a hydraulic brake booster according to a fifth embodiment of the present invention, the view being a modification of FIG. 1.

Thus, in FIG. 13, when the primary master cylinder $M_1$ is actuated, an output hydraulic pressure therefrom is supplied to the second input hydraulic pressure chamber $87_2$ of the secondary master cylinder $M_2f$ and the controlling hydraulic pressure chamber 20 of the proportional booster valve Vf, Vr. Since the hydraulic pressure supplied to the second input hydraulic pressure chamber $87_2$ of the second master cylinder $M_2f$ functions to advance the operating piston 53 immediately, the relief port valve 60 is closed and the output hydraulic pressure chamber 54 can be boosted normally. In addition, when the hydraulic pressure supplied to the controlling hydraulic pressure chamber is boosted more than the predetermined value, as in the case with the first embodiment, an actuation of the proportional booster valve Vf, Vr is started, the boosting hydraulic pressure is supplied from the boosting hydraulic pressure chamber 30 into the first input hydraulic pressure chamber $87_1$, whereby the operating piston 53 is pushed forward furthermore. Therefore, since the forward thrust of the operating piston 53 becomes a sum of a thrust produced on the small-diameter piston portion 53s by the output hydraulic pressure of the primary master cylinder $M_1$ supplied into the second input hydraulic pressure chamber $87_2$ and a thrust produced on the intermediate piston portion 53m by the boosted hydraulic pressure supplied to the first input hydraulic pressure chamber $87_1$, the output characteristics of the secondary master cylinder $M_2f$ becomes identical to those described in the first embodiment.

Figure 14:
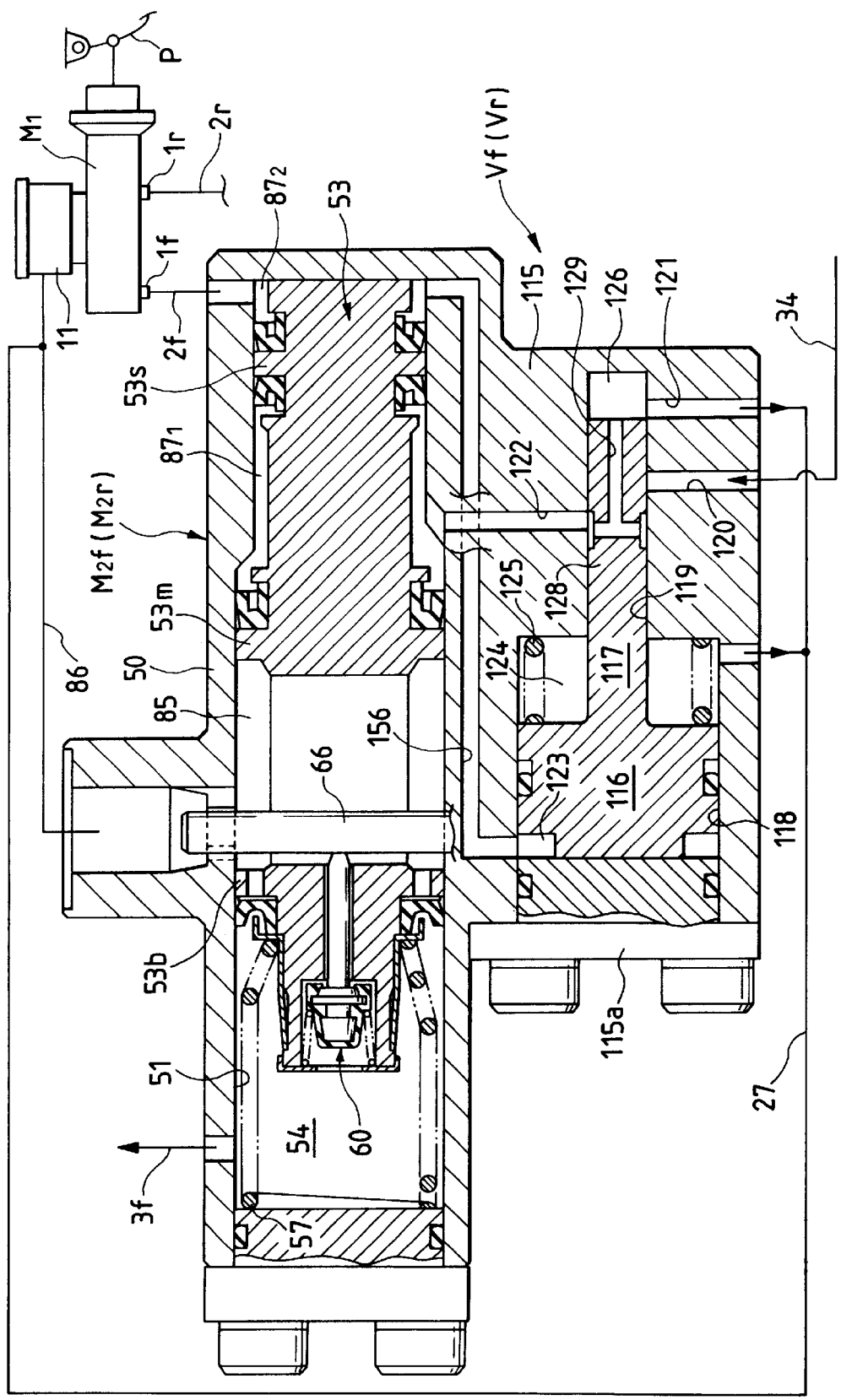
FIG. 14 is a longitudinal sectional view of a hydraulic brake booster according to the fifth embodiment of the present invention, the view being a modification of FIG. 4.

Also, in FIG. 14, when the primary master cylinder $M_1$ is actuated, an output hydraulic pressure therefrom is supplied to the second input hydraulic pressure chamber $87_2$ of the secondary master cylinder $M_2f$ and the controlling hydraulic pressure chamber 123 of the proportional booster valve Vf, Vr. Since the hydraulic pressure supplied to the second input hydraulic pressure chamber $87_2$ of the second master cylinder $M_2f$ functions to advance the operating piston 53 immediately, the relief port valve 60 is closed and the output hydraulic pressure chamber 54 can be boosted normally. In addition, when the hydraulic pressure supplied to the controlling hydraulic pressure chamber 123 is boosted more than the predetermined value, as in the case with the second embodiment, an actuation of the proportional booster valve Vf, Vr is started, the boosting hydraulic pressure is supplied from the booster port 122 into the first input hydraulic pressure chamber $87_1$, whereby the operating piston 53 is pushed forward furthermore. Therefore, since the forward thrust of the operating piston 53 becomes a sum of a thrust produced on the small-diameter piston portion 53s by the output hydraulic pressure of the primary master cylinder $M_1$ supplied into the second input hydraulic pressure chamber $87_2$ and a thrust produced on the intermediate piston portion 53m by the boosted hydraulic pressure supplied to the first input hydraulic pressure chamber $87_1$, the output characteristics of the secondary master cylinder $M_2f$ becomes identical to those described in the second embodiment.

In the fifth embodiment, too, since the first and second input hydraulic pressure chambers $87_1$, $87_2$ of the secondary master cylinder $M_2f$ are independent from each other, even if a boosting hydraulic pressure is not supplied into the first input hydraulic pressure chamber $87_1$ due to a failure in the hydraulic power source 5, the operating piston 53 can be actuated by the output hydraulic pressure supplied to the second input hydraulic pressure chamber $87_2$ from the primary master cylinder $M_1$, whereby a fail safety can be secured.

[Sixth Embodiment]

Next, referring to FIG. 15, a sixth embodiment will be explained.

Figure 15:
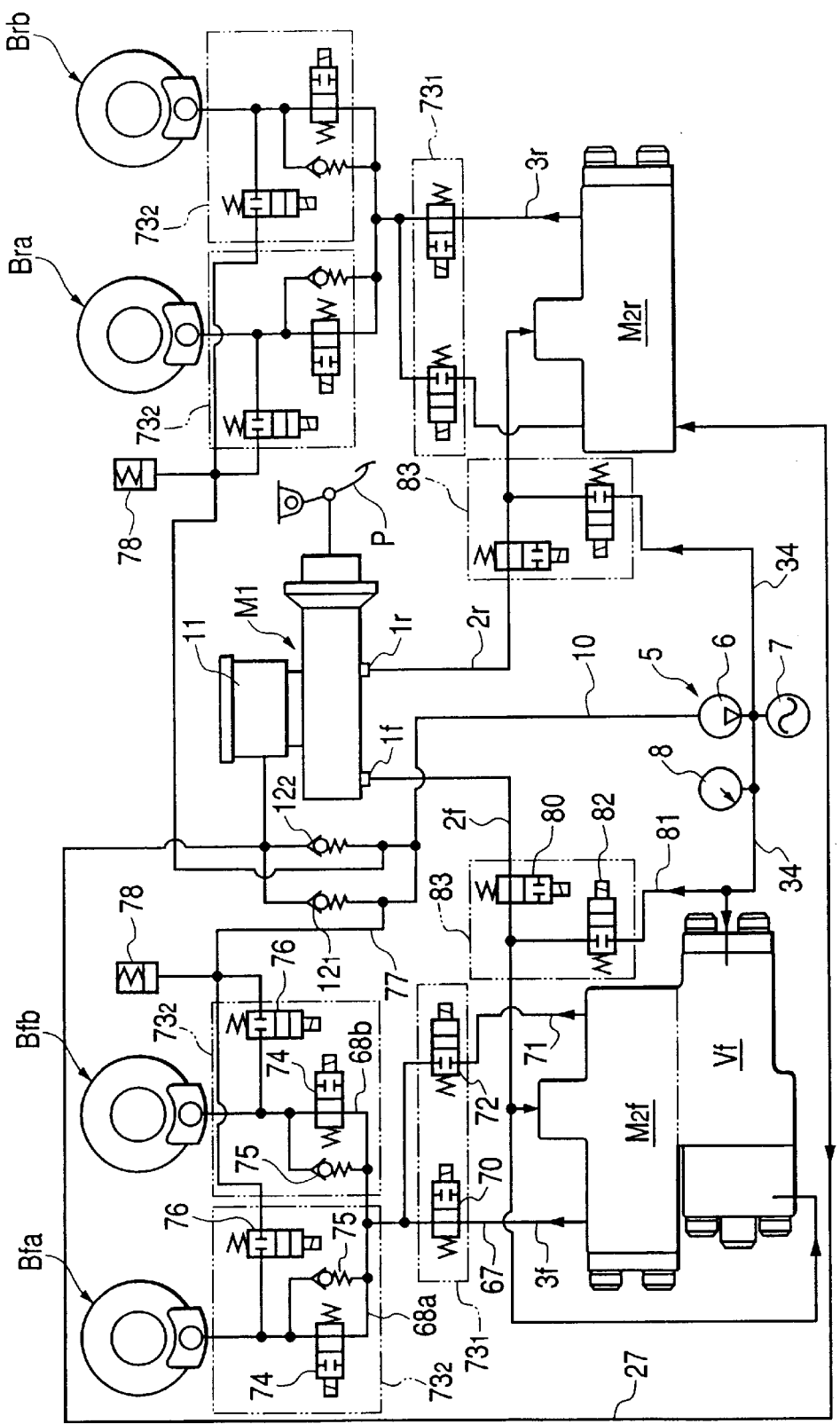
FIG. 15 is a hydraulic pressure circuit diagram of an automobile brake system equipped with hydraulic brake boosters according to a sixth embodiment of the present invention, the view being a modification of FIG. 1.

In FIG. 15, since the front proportional booster valve Vf is used in common for the front and rear secondary master cylinders $M_2f$, $M_2r$, the rear proportional booster valve Vr is omitted. Therefore, by reference to FIG. 13, the communicating hole 56 connected to the boosting hydraulic pressure chamber 30 is branched so that the communicating hole 56 is connected to the both second input hydraulic pressure chambers $55_2$ of the front and rear secondary master cylinders $M_2f$, $M_2r$.

Further, the control hydraulic pressure chamber 20 of the front proportional booster valve Vr is connected to a hydraulic pressure chamber in a front side of the primary master cylinder $M_1$, which is a tandem-type master cylinder.

The remaining constructions of this embodiment are the same as those of the first embodiment, and therefore in the figure like reference numerals are given to like portions of the first embodiment and descriptions thereof will be omitted.

Accordingly, the rear secondary master cylinder $M_2r$ is operated by means of the front proportional booster valve Vf, and the rear proportional booster valve Vr is omitted. Therefore, the number of members is reduced, and variation in the boost start timing between the front and rear secondary master cylinder $M_2f$, $M_2r$ is prevented. Further, since the boost start timing is advanced by the connection between the hydraulic pressure chamber in the front side of the tandem-type master cylinder $M_1$ and the control hydraulic pressure chamber 20, the front proportional booster valve Vf is operated quickly, to thereby improve the response property of the booster valve Vf.

The present invention is not limited to the afore-described embodiments and can be modified variously without departing the spirit thereof. For instance, instead of the relief port valves 60 of the front and rear secondary master cylinders, the relief port made open in the internal surface of the cylinder bore 51 may be formed into a side port type which is adapted to be opened and/or closed by a cup seal at the front end of the operating piston 53. In addition, the present invention may be applied to a hydraulic brake booster for a motorcycle, too.

Thus, according to the first aspect of the present invention, there is provided a hydraulic brake booster comprising a primary master cylinder for generating an output hydraulic pressure in response to a brake operation input, a hydraulic power source, a fluid tank for storing fluid for the hydraulic power source and proportional booster valves each comprising in turn a controlling hydraulic pressure chamber for introducing an output hydraulic pressure from the primary master cylinder, a boosting hydraulic pressure chamber for generating a boosting hydraulic pressure for actuating wheel brakes, control piston means adapted to move in response to hydraulic pressures of the controlling hydraulic pressure chamber and the boosting hydraulic pressure chamber between a withdrawn position closer to the controlling hydraulic pressure chamber and an advanced position closer to the boosting hydraulic pressure chamber, an inlet valve for opening and/or closing in response to advancement and/or withdrawal of the control piston means a communication between the hydraulic power source and the boosting hydraulic pressure chamber, and an outlet valve for closing and/or opening in response to advancement and of the control piston means a communication between the boosting hydraulic pressure chamber and the fluid tank, whereby a hydraulic pressure adapted to be boosted in proportion to the hydraulic pressure of the controlling hydraulic pressure chamber is generated in the boosting hydraulic pressure chamber. Consequently, according to the first feature of the present invention, when the primary master cylinder is actuated, a boosting hydraulic pressure in proportion to the output hydraulic pressure thereof can be outputted from the proportional booster valves, whereby the wheel brakes can be actuated strongly. Moreover, the primary master cylinder and the proportional booster valves do not interfere with each other and can be individually freely disposed even in a narrow engine compartment of a vehicle.

Further, according to a second aspect of the present invention, there is provided a hydraulic brake booster comprising a primary master cylinder for generating an output hydraulic pressure in response to a brake operation input, a hydraulic power source, a fluid tank for storing fluid for the hydraulic power source and proportional booster valves for proportionally boosting an output hydraulic pressure from the primary master cylinder and supplying the output hydraulic pressure so boosted to wheel brakes, the proportional booster valves each comprising a valve housing having a cylinder bore, a valve bore continuous with one end of the cylinder bore, a hydraulic power source port communicating with the hydraulic power source and open to an inner circumferential surface of the valve bore, a return port communicating with the fluid tank and open to an inner circumferential surface of the valve bore and a booster port communicating with the wheel brakes, a control piston slidably fitted in the cylinder bore for defining at the other end of the cylinder bore a controlling hydraulic pressure chamber for introducing the output hydraulic pressure from the primary master cylinder and a spool valve body connected to the control piston and slidably fitted in the valve bore, wherein when the control piston is advanced through boosting the hydraulic pressure in the controlling hydraulic pressure chamber, the spool valve body establishes a communication between the hydraulic power port and the booster port, while when the control piston is retracted through reducing the hydraulic pressure in the controlling hydraulic pressure chamber, the spool valve body establishes a communication between the return port and the booster port. Consequently, when the primary master cylinder is actuated, a boosting hydraulic pressure in proportion to the output hydraulic pressure can be outputted from the proportional booster valves so as to be supplied to the wheel brakes for actuation thereof with a strong force. Moreover, there is no risk of the primary master cylinder and the proportional booster valves interfering with each other and they can be individually freely disposed in the narrow engine compartment. Furthermore, the proportional booster valve comprising the valve housing, the control piston and the spool valve body has a very limited number of components and is simple in construction, and therefore the proportional booster valve so constructed can be provided inexpensively.

According to a third aspect of the present invention, there is provided a hydraulic brake booster wherein secondary master cylinders are disposed, respectively, between the proportional booster valves and the wheel brakes, the secondary master cylinders each comprising a cylinder body, an operating piston fittingly mounted in a cylinder bore of the cylinder body in such a manner as to move back and forth therein so as to divide the interior of the cylinder body into partitions such as a front output hydraulic pressure chamber, an intermediate primary input hydraulic pressure chamber and a rear secondary input hydraulic pressure chamber, a return spring for biassing the operating piston in a withdrawal direction and valve means for establishing a communication between the primary input hydraulic pressure chamber and the output hydraulic pressure chamber when the operating piston is situated at a withdrawal position and cutting off a communication between the primary input hydraulic pressure chamber and the output hydraulic pressure chamber when the operating piston is situated at an advanced position, the primary input hydraulic pressure chambers being connected to output ports of the primary master cylinder, respectively, the secondary input hydraulic pressure chambers being connected to the boosting hydraulic pressure chamber (the booster ports) of the proportional booster valves, respectively, and the output hydraulic pressure chambers being connected to the wheel brakes, respectively. Consequently, even if the second input hydraulic pressure chamber of the secondary master cylinder cannot be boosted due to a failure in the hydraulic power source or proportional booster valve, the output hydraulic pressure of the primary master cylinder can directly be delivered to the wheel brakes for actuation thereof, whereby a fail safe can be secured.

According to the fourth aspect of the present invention, there is provided a hydraulic brake booster wherein the operating pistons of the secondary master cylinders each have formed thereon a front large diameter piston portion and a rear small diameter piston portion whose diameter is smaller than that of the front large diameter piston portion, the primary input hydraulic chamber being defined between the large diameter piston portion and the small diameter piston portion and the secondary input hydraulic pressure chamber being defined between the small diameter portion and a rear end face of the cylinder bore. Consequently, the output hydraulic pressure from the primary master cylinder supplied to the first input hydraulic pressure chamber can also be added to the operating piston as a thrust, whereby the brake force can be increased.

Furthermore, according to a fifth aspect of the present invention, there is provided a hydraulic brake booster wherein secondary master cylinders are disposed, respectively, between the boosting hydraulic pressure chambers (the booster ports) of the proportional booster valves and the wheel brakes, the secondary master cylinders each having a cylinder body, an operating piston fittingly mounted in a cylinder bore of the cylinder body in such a manner as to move back and forth therein so as to define in the cylinder bore a front output hydraulic pressure chamber, an intermediate supply fluid chamber, a rear primary input hydraulic pressure chamber and a rearmost secondary input hydraulic pressure chamber, a return spring for biassing the operating piston in a retracting direction and valve means for establishing a communication between the supply fluid chamber and the output hydraulic pressure chamber when the operating piston is situated at a retracting position and cutting off a communication between the supply fluid chamber and the output hydraulic pressure chamber when the operating piston is situated at an advanced position, the working piston having formed thereon a front large diameter piston portion facing toward the output hydraulic pressure chamber and the supply fluid chamber at front and rear end faces thereof, respectively, an intermediate piston portion facing toward the supply fluid chamber and the first input hydraulic pressure chamber at front and rear end faces thereof, respectively, and a small diameter piston portion whose diameter is smaller than that of the intermediate piston portion and facing to the secondary input hydraulic pressure chamber at a rear end face thereof, one of the primary and secondary input hydraulic pressure chambers being connected to output port of the primary master cylinder and the other to the boosting hydraulic pressure chamber (the booster port) of the proportional booster valve, the output hydraulic pressure chamber being connected to the wheel brakes, and the supply fluid chamber being connected to the operating fluid tank. Consequently, a thrust resulting from the output hydraulic pressure from the primary master cylinder and a thrust resulting from the boosting hydraulic pressure of the proportional booster valve are added together for addition to the operating piston of the secondary master cylinder, whereby the operating piston can be actuated strongly. Moreover, even if there is a failure in the hydraulic power source and the proportional booster valve, the secondary master cylinder can be actuated by the output hydraulic pressure from the primary master cylinder for actuation of the wheel brakes, whereby a fail safe can be secured.

According to a sixth aspect of the present invention, a control piston to which an area presented to the pressure of the controlling hydraulic pressure chamber is caused to face and a reaction force piston connected to the control piston and whose area presented to the pressure is caused to face to the boosting hydraulic pressure chamber are provided in the control piston means and the area presented to the pressure of this reaction force piston is set smaller than that of the control piston. Consequently, according to this fifth feature of the present invention, during the operation of the proportional booster valves, a reaction force in response to an appropriate boosting hydraulic pressure outputted by the operating proportional booster valves can be fed back to the primary master cylinder, whereby the operator can feel the brakes operating properly.

Furthermore, according to a seventh aspect of the present invention, a return spring is connected to the control piston means, which return spring is adapted to bias the control piston means toward the controlling hydraulic pressure chamber side under a predetermined set load. Consequently, the output hydraulic pressure value of the primary master cylinder for actuating the proportional booster valves can freely be set by selecting a set load for the return spring.

Furthermore, according to an eighth aspect of the present invention, as the proportional booster valves there are provided together a front proportional booster valve and a rear proportional booster valve so as to correspond, respectively, to front wheel brakes and rear wheel brakes, a ratio of areas presented to the pressure of the reaction piston of the rear proportional booster valve and the control piston is set greater than a ratio of areas presented to the pressure of the reaction force chamber of the front proportional booster valve and the control piston, and the set load of a return spring for the rear proportional booster valve becomes smaller than that of the return spring of the front proportional booster valve. Consequently, the brake force can be distributed between the front wheel brakes and the rear wheel brakes with a desired distribution ratio from the viewpoints of brake efficiency.

According to a ninth feature of the present invention, there is provided a hydraulic brake booster wherein the hydraulic power source comprises a hydraulic pump and an accumulator for accumulating discharge hydraulic pressures of the hydraulic pump, while anti-locking brake fluid passages extending from the boosting hydraulic pressure chamber (the booster port) are connected, respectively, to main brake fluid passages for connecting the output hydraulic pressure chambers of the secondary master cylinders, respectively, to the wheel brakes, wherein first anti-locking control valve means are provided upstream of a connecting point of the main brake fluid passages and the anti-locking brake fluid passages which is adapted to be switched over between a state in which the main brake fluid passages are opened while the anti-locking brake fluid passages are closed and a state in which the main brake fluid passages are closed while the anti-locking brake fluid passages are opened, wherein discharge fluid passages are connected, respectively, to the main brake fluid passages downstream of the connecting point, and wherein second anti-locking control valve means are provided upstream of the connecting point which is adapted to be switched over between a state in which the main brake fluid passages are opened while the discharge fluid passages are closed, a state in which the main brake fluid passages are closed while the discharge fluid passages are opened, and a state in which both the main brake fluid passages and the discharge fluid passages are closed. Consequently, during the anti-locking controlling of the wheel brakes, a change in hydraulic pressure is not allowed to be delivered to the primary and secondary master cylinders, and therefore it is possible to prevent an unnecessary increase in operation travel relative to the primary master cylinder and occurrence of a kick-back phenomenon in which an uneasy feeling is imparted to the operator.

In addition, according to a tenth aspect of the present invention, there is provided a hydraulic brake booster wherein downstream ends of the discharge fluid passages are caused to open to the fluid tank of the primary master cylinder. Consequently, it is possible to simplify the pressure reduction structure for anti-locking controlling of the wheel brakes.

According to an eleventh aspect of the present invention, there is provided a hydraulic brake booster wherein a one-way valve for preventing a reverse flow is provided in an intake fluid passage connecting between the hydraulic pump and the fluid tank, and wherein the downstream ends of the discharge fluid passages are connected to the intake fluid passage between the one-way valve and the hydraulic pump. Consequently, a pressure reduction of the wheel brakes for anti-lock controlling can be effected by allowing a hydraulic pressure released to the discharge fluid passage from the wheel brakes to be absorbed by the hydraulic pressure reservoir, and when the hydraulic pump is actuated for accumulating pressures in the accumulator, since the hydraulic pressure caused to be absorbed in the hydraulic pressure reservoir before is sent to the accumulator by the hydraulic pump, there is no risk of increasing the load of the hydraulic pump. Moreover, even if the discharge fluid passage is kept open due to a failure in the second anti-locking control means, a release of a hydraulic pressure from the wheel brakes to the fluid tank is prevented by the one-way valve, whereby a normal operation of the wheel brakes can be secured.

Furthermore, according to a twelfth aspect of the present invention, there is provided a hydraulic brake booster wherein highly pressurized fluid passages continuous with the accumulator are connected to input fluid passages connecting between the primary master cylinder and the secondary master cylinders, and wherein automatic brake control means are provided upstream of the connecting point which is adapted to be switched over between a state in which the input fluid passages are opened while the highly pressurized fluid passages are closed and a state in which the input fluid passages are closed while the highly pressurized fluid passages are opened. Consequently, automatic braking can be effected by using the hydraulic pressure of the accumulator.

Moreover, according to a thirteenth aspect of the present invention, there is provided a hydraulic brake booster wherein the proportional booster valves and the secondary master cylinders are disposed in parallel with and adjacent to each other, and wherein a housing for the proportional booster valve and the cylinder body of the secondary master cylinder are made integral with each other. Consequently, the assembly comprising the proportional booster valve and the secondary master cylinder can be constructed in simple and compact fashions, facilitating the installation of the booster in a narrow and limited space.

According to a fourteenth aspect of the present invention, there is provided a hydraulic brake booster wherein the spool valve body is formed such that the diameter thereof is smaller than that of the control piston, a reaction force chamber being formed in the valve bore to which the spool valve body faces at an outer end face thereof which is opposite to an end face thereof which faces to the control piston, the reaction force chamber being caused to communicate with the booster port. Consequently, during the operation of the proportional booster valve, an appropriate reaction force corresponding to the boosting hydraulic pressure outputted from the proportional booster valve is fed back to the primary master cylinder, and the operator can feel a good operating feeling.

According to a fifteenth aspect of the present invention, there is provided a hydraulic brake booster wherein a return spring is connected to the control piston, the return spring being adapted to bias the control spring toward the controlling hydraulic pressure chamber under a predetermined set load. Consequently, a value for the output hydraulic pressure of the primary master cylinder for starting the actuation of the proportional booster valve can freely be set by selecting a set load for the return spring.

According to a sixteenth aspect of the present invention, there is provided a hydraulic brake booster wherein as the proportional booster valves there are provided together a front proportional booster valve and a rear proportional booster valve so as to correspond, respectively, to front wheel brakes and rear wheel brakes, wherein a ratio of areas presented to the pressure of a spool valve body facing to a reaction force chamber of the rear proportional booster valve and a control piston facing to a controlling hydraulic pressure chamber of the rear proportional booster valve is set greater than a ratio of areas presented to the pressure of a spool valve body facing to a reaction force chamber of the front proportional booster valve and a control piston facing to a controlling hydraulic pressure chamber of the front proportional booster valve, and wherein set loads of return springs, respectively, of the front and rear proportional booster valves are set such that an actuating hydraulic pressure of the front proportional booster valve becomes higher than that of the rear proportional booster valve. Consequently, a brake force can be distributed to the front and rear wheel brakes with a desirable ratio from the viewpoints of braking efficiency without using any special proportional pressure reduction valve.

The present disclosure relates to the subject matter contained in Japanese patent applications No. Hei. 10-363391 filed on Dec. 21, 1998 and No. Hei. 11-122932 filed on Apr. 28, 1999 which are expressly incorporated herein by reference in its entirety.

What is claimed is:

1. A hydraulic brake booster comprising:
  a primary master cylinder which generates an output hydraulic pressure in response to a brake operation input;
  a hydraulic power source;
  a fluid tank which stores fluid for said hydraulic power source; and
  a proportional booster valve which proportionally boosts an output hydraulic pressure from said primary master cylinder and supplies the output hydraulic pressure so boosted to wheel brakes, said proportional booster valve including:
    a casing having a cylinder bore;
    a control piston unit defining in conjunction with said cylinder bore, a controlling hydraulic pressure chamber introducing an output hydraulic pressure from said primary master cylinder and a boosting hydraulic pressure chamber generating a boosting hydraulic pressure for actuating wheel brakes, said control piston fitted in said cylinder bore so as to reciprocate between a first position and a second position in response to hydraulic pressures of said controlling hydraulic pressure chamber and said boosting hydraulic pressure chamber;
    an inlet valve communicating between said hydraulic power source and said boosting hydraulic pressure chamber in response to the movement of said control piston unit; and
    an outlet valve communicating between said boosting hydraulic pressure chamber and said fluid tank in response to the movement of said control piston unit, whereby a hydraulic pressure boosted in proportion to the hydraulic pressure of said controlling hydraulic pressure chamber is generated in said boosting hydraulic pressure chamber;
  a secondary master cylinder disposed between said boosting hydraulic pressure chamber of said proportional booster valve and said wheel brakes, said secondary master cylinder comprising:
    a cylinder body formed with a cylinder bore;
    an operating piston fitted in said cylinder bore so as to reciprocate between a third position and a fourth position, said operating piston dividing the interior of said cylinder body into a front output hydraulic pressure chamber, an intermediate primary input hydraulic pressure chamber and a rear secondary input hydraulic pressure chamber, said third position defining a maximum second input hydraulic pressure chamber, said fourth position defining a minimum second input hydraulic pressure chamber;
    a return spring biasing said operating piston toward said fourth position of said operating piston; and
    a valve unit communicating between said primary input hydraulic pressure chamber and said output hydraulic pressure chamber when said operating piston is located at said fourth position and cutting off a communication between said primary input hydraulic pressure chamber and said output hydraulic pressure chamber when said operating piston is located at said third position, wherein
    said primary input hydraulic pressure chamber is connected to an output port of said primary master cylinder,
    said secondary input hydraulic pressure chamber is connected to said boosting hydraulic pressure chamber of said proportional booster valve, and
    said output hydraulic pressure chamber is connected to said wheel brakes.

2. A hydraulic brake booster as set forth in claim 1, wherein said operating piston of said secondary master cylinder includes:
  a large diameter piston portion; and
  a small diameter piston portion having a diameter smaller than that of said front large diameter piston portion,
    said primary input hydraulic chamber is defined between said large diameter piston portion and said small diameter piston portion, and
    said secondary input hydraulic pressure chamber is defined between said small diameter piston portion and an end face of said cylinder bore.

3. A hydraulic brake booster comprising:
  a primary master cylinder which generates an output hydraulic pressure in response to a brake operation input;
  a hydraulic power source;
  a fluid tank which stores fluid for said hydraulic power source; and
  a proportional booster valve which proportionally boosts an output hydraulic pressure from said primary master cylinder and supplies the output hydraulic pressure so boosted to wheel brakes, said proportional booster valve including:
    a casing having a cylinder bore;
    a control piston unit defining in conjunction with said cylinder bore, a controlling hydraulic pressure chamber introducing an output hydraulic pressure from said primary master cylinder and a boosting hydraulic pressure chamber generating a boosting hydraulic pressure for actuating wheel brakes, said control piston fitted in said cylinder bore so as to reciprocate between a first position and a second position in response to hydraulic pressures of said controlling hydraulic pressure chamber and said boosting hydraulic pressure chamber;
    an inlet valve communicating between said hydraulic power source and said boosting hydraulic pressure chamber in response to the movement of said control piston unit; and
    an outlet communicating between said boosting hydraulic pressure chamber and said fluid tank in response to the movement of said control piston unit, whereby a hydraulic pressure boosted in proportion to the hydraulic pressure of said controlling hydraulic pressure chamber is generated in said boosting hydraulic pressure chamber;
  a secondary master cylinder disposed between said boosting hydraulic pressure chamber of said proportional booster valve and said wheel brakes, said secondary master cylinder including:
    a cylinder body formed with a cylinder bore;
    an operating piston fitted in said cylinder bore so as to reciprocate between a third position and a fourth position, said operating piston dividing the interior of said cylinder body into, in this order, an output hydraulic pressure chamber, a supply fluid chamber, a primary input hydraulic pressure chamber and a secondary input hydraulic pressure chamber, said third position defining a maximum second input hydraulic pressure chamber, said fourth position defining a minimum second input hydraulic pressure chamber;

a return spring biasing said operating piston toward said fourth position of said operating piston; and a valve unit communicating between said supply fluid chamber and said output hydraulic pressure chamber when said operating piston is located at said fourth position and cutting off a communication between said supply fluid chamber and said output hydraulic pressure chamber when said operating piston is located at said third position, wherein said operating piston includes:

a large diameter piston portion facing toward said output hydraulic pressure chamber and said supply fluid chamber at both end faces thereof, respectively;

an intermediate piston portion facing toward said supply fluid chamber and said first input hydraulic pressure chamber at both end faces thereof, respectively; and a small diameter piston portion having a diameter smaller than that of said intermediate piston portion and facing to said secondary input hydraulic pressure chamber at one end face thereof, and further wherein one of said primary and secondary input hydraulic pressure chambers is connected to an output port of said primary master cylinder, the other of said primary and secondary input hydraulic pressure chambers is connected to said boosting hydraulic pressure chamber of said proportional booster valve, said output hydraulic pressure chamber is connected to said wheel brakes, and said supply fluid chamber is connected to said fluid tank.

4. A hydraulic brake booster as set forth in claim 1, wherein said control piston unit includes:

a control piston having a surface to which the pressure from said controlling hydraulic pressure chamber is applied; and a reaction force piston connected to said control piston and having a surface to which the pressure from said boosting hydraulic pressure chamber is applied, and a first diameter of said surface of said reaction force piston is smaller than a second diameter of said surface of said control piston.

5. A hydraulic brake booster as set forth in claim 4, wherein said proportional booster valve includes a return spring connected to said control piston unit in such a manner as to bias said control piston unit toward said controlling hydraulic pressure chamber with a predetermined set load.

6. A hydraulic brake booster as set forth in claim 5, wherein said proportional booster valve comprises a front proportional booster valve corresponding to front wheel brakes and a rear proportional booster valve corresponding to rear wheel brakes, wherein a ratio of the first area to the second area in said rear proportional booster valve is set greater than that in said front proportional booster valve, and wherein said set loads of said return springs of said front and rear proportional booster valves are set such that an actuating hydraulic pressure of said front proportional booster valve becomes higher than that of said rear proportional booster valve.

7. A hydraulic brake booster as set forth in claim 1, wherein said hydraulic power source includes a hydraulic pump and an accumulator for accumulating discharge hydraulic pressures of said hydraulic pump, and said hydraulic brake booster further comprises:

a main brake fluid passage for connecting said output hydraulic pressure chamber of said secondary master cylinder to said wheel brakes;

an anti-locking brake fluid passage extending from said boosting hydraulic pressure chamber connected to said main brake fluid passage at a first connecting point;

a discharge fluid passage connected to said main brake fluid passage at a second connecting point downstream of said first connecting point;

a first anti-locking control valve unit provided upstream of said first connecting point in said main brake fluid passage and said anti-locking brake fluid passages, said first anti-locking control valve unit being switchable between a state in which said main brake fluid passage is opened while said anti-locking brake fluid passage is closed and a state in which said main brake fluid passage is closed while said anti-locking brake fluid passage is opened; and a second anti-locking control valve unit provided upstream of said second connecting point in said main brake fluid passage and said discharge fluid passage, said second anti-locking control valve unit being switchable among a state in which said main brake fluid passage is opened while said discharge fluid passage is closed, a state in which said main brake fluid passage is closed while said discharge fluid passage is opened, and a state in which said main brake fluid passage and said discharge fluid passage are closed.

8. A hydraulic brake booster as set forth in claim 7, wherein said discharge fluid passage is communicated to said fluid tank of said primary master cylinder at a downstream end thereof.

9. A hydraulic brake booster as set forth in claim 7, further comprising:

an intake fluid passage connecting between said hydraulic pump and said fluid tank;

a one-way valve for a reverse flow prevention provided in said intake fluid passage, said downstream end of said discharge fluid passage being connected to said intake fluid passage between said one-way valve and said hydraulic pump; and a hydraulic reservoir connected to said discharge fluid passage.

10. A hydraulic brake booster as set forth in claim 1, wherein said hydraulic power source includes a hydraulic pump and an accumulator for accumulating discharge hydraulic pressures of said hydraulic pump, and said hydraulic brake booster further comprises:

an input fluid passage connecting between said primary master cylinder and said secondary master cylinder;

an auxiliary input fluid passage communicating with said accumulator and connected to said input fluid passage at a connecting point; and an automatic brake control valve unit provided upstream of said connecting point in said input fluid passage and said auxiliary input fluid passage, said automatic brake control valve unit being switchable between a state in which said input fluid passage is opened while said auxiliary input fluid passage is closed and a state in which said input fluid passage is closed while said auxiliary input fluid passage is opened.

11. A hydraulic brake booster as set forth in claim 1, wherein said proportional booster valve and said secondary master cylinder are disposed in parallel with and adjacent to each other, and wherein said casing for said proportional booster valve and said cylinder body of said secondary master cylinder are formed integral with each other.

12. A hydraulic brake booster as set forth in claim 1, wherein said secondary master cylinder includes a pair of secondary master cylinders respectively corresponding to two systems, and said both secondary input hydraulic pressure chambers of said both secondary master cylinders are connected to said boosting hydraulic pressure chamber of said proportional booster valve.

13. A hydraulic brake booster as set forth in claim 12, wherein said primary master cylinder is a tandem-type master cylinder, and said control hydraulic pressure chamber of said proportional booster valve is connected to a hydraulic pressure chamber in a front side of said tandem-type master cylinder.

14. A hydraulic brake booster as set forth in claim 3, wherein said secondary master cylinder includes a pair of secondary master cylinders respectively corresponding to two systems, and said both secondary input hydraulic pressure chambers of said both secondary master cylinders are connected to said boosting hydraulic pressure chamber of said proportional booster valve.

15. A hydraulic brake booster as set forth in claim 14, wherein said primary master cylinder is a tandem-type master cylinder, and said control hydraulic pressure chamber of the proportional booster valve is connected to a hydraulic pressure chamber in a front side of said tandem-type master cylinder.

16. A hydraulic brake booster as set forth in claim 1, wherein said inlet valve is opened and said outlet valve is closed when said control piston unit is located at said first position defining the maximum controlling hydraulic pressure chamber, and said inlet valve is closed and said outlet valve is opened when said control piston unit is located at said second position defining the minimum controlling hydraulic pressure chamber.

17. A hydraulic brake booster as set forth in claim 16, wherein said inlet valve and said outlet valve close simultaneously to hold hydraulic pressure constant inside said boosting hydraulic pressure chamber.

18. A hydraulic brake booster as set forth in claim 1, wherein said primary master cylinder and said proportional booster valve operate without interference and are individually freely disposed.

\* \* \* \* \*